US012764029B2

(12) United States Patent
Javaid et al.

(10) Patent No.: US 12,764,029 B2
(45) Date of Patent: Oct. 13, 2026

(54) TRANSMISSION AND PROCESSING OF DATA IN PARALLEL SYSTEMS

(71) Applicant: Xilinx, Inc., San Jose, CA (US)

(72) Inventors: Haris Javaid, JTC Changi Business Park (SG); Guanwen Zhong, JTC Changi Business Park (SG); Mario Baldi, Cundys Harbor, ME (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 18/759,693

(22) Filed: Jun. 28, 2024

(65) Prior Publication Data

US 2026/0005928 A1 Jan. 1, 2026

(51) Int. Cl.
*H04L 69/22* (2022.01)
*H04L 41/14* (2022.01)
*H04L 41/16* (2022.01)

(52) U.S. Cl.
CPC .............. *H04L 41/14* (2013.01); *H04L 41/16* (2013.01); *H04L 69/22* (2013.01)

(58) Field of Classification Search
CPC ........ G06N 3/0455; G06N 3/084; G06N 3/09; G06N 3/082; G06F 16/2237; H04L 41/14; H04L 41/16; H04L 69/22
See application file for complete search history.

(56) References Cited

U.S. PATENT DOCUMENTS

| | | | | |
|---|---|---|---|---|
| 9,489,506 | B2 * | 11/2016 | Tyson | G06F 21/44 |
| 12,585,990 | B2 * | 3/2026 | Nimmagadda | G06N 3/082 |
| 12,591,804 | B2 * | 3/2026 | Akdeniz | G06N 20/00 |
| 2015/0245412 | A1 * | 8/2015 | Tyson | H04H 20/71 370/338 |
| 2018/0218171 | A1 | 8/2018 | Bellala et al. | |
| 2021/0037120 | A1 * | 2/2021 | Lee | H04L 12/40013 |
| 2021/0295168 | A1 * | 9/2021 | Xu | G06N 3/098 |
| 2021/0374503 | A1 * | 12/2021 | Kim | G06N 3/10 |
| 2022/0326994 | A1 * | 10/2022 | Mueller | G06F 21/6218 |
| 2023/0144562 | A1 * | 5/2023 | Zirr | G06N 3/084 345/419 |
| 2023/0300063 | A1 * | 9/2023 | Naeimi | H04L 45/16 370/390 |
| 2024/0276295 | A1 * | 8/2024 | Prasad | H04L 69/22 |
| 2024/0345753 | A1 * | 10/2024 | Wang | G06F 3/0644 |
| 2025/0190221 | A1 * | 6/2025 | Nair | G06F 9/4881 |
| 2026/0056771 | A1 * | 2/2026 | Meyer | G06F 9/3867 |

* cited by examiner

*Primary Examiner* — Jason D Cardone
(74) *Attorney, Agent, or Firm* — Greenberg Traurig, LLP

(57) ABSTRACT

Systems and methods for transmitting and processing data can use representations of data portions (e.g., blocks, chunks, or other subunits of data) that match a specified pattern, such as zero gradients in a machine learning training algorithm. These representations can allow different parts of a system to communicate the existence of these data portions to each other without actually transmitting the data portions while also allowing for the transmission of data portions that do not match the specified pattern. Processing of data can also use these representations or indicators as placeholders for the omitted data and perform calculations based on tallies, skipped memory locations, or other ways of accounting for the omitted data. This can in some cases reduce computing resources used to process data, such as data that may have been communicated using such representations.

20 Claims, 11 Drawing Sheets

TRANSMISSION AND PROCESSING OF DATA IN PARALLEL SYSTEMS

BACKGROUND

Machine learning ("ML") tools and artificial intelligence ("AI") applications can be used to guide decision-making and/or to control systems in a wide variety of fields and industries, e.g., security; transportation; fraud detection; risk assessment and management; supply chain logistics; development and discovery of pharmaceuticals and diagnostic techniques; and energy management. In machine learning, certain techniques (e.g., pattern recognition and/or statistical inference techniques) can be performed by computer systems configured to perform specific tasks. Machine learning techniques may be used to build data analytics models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
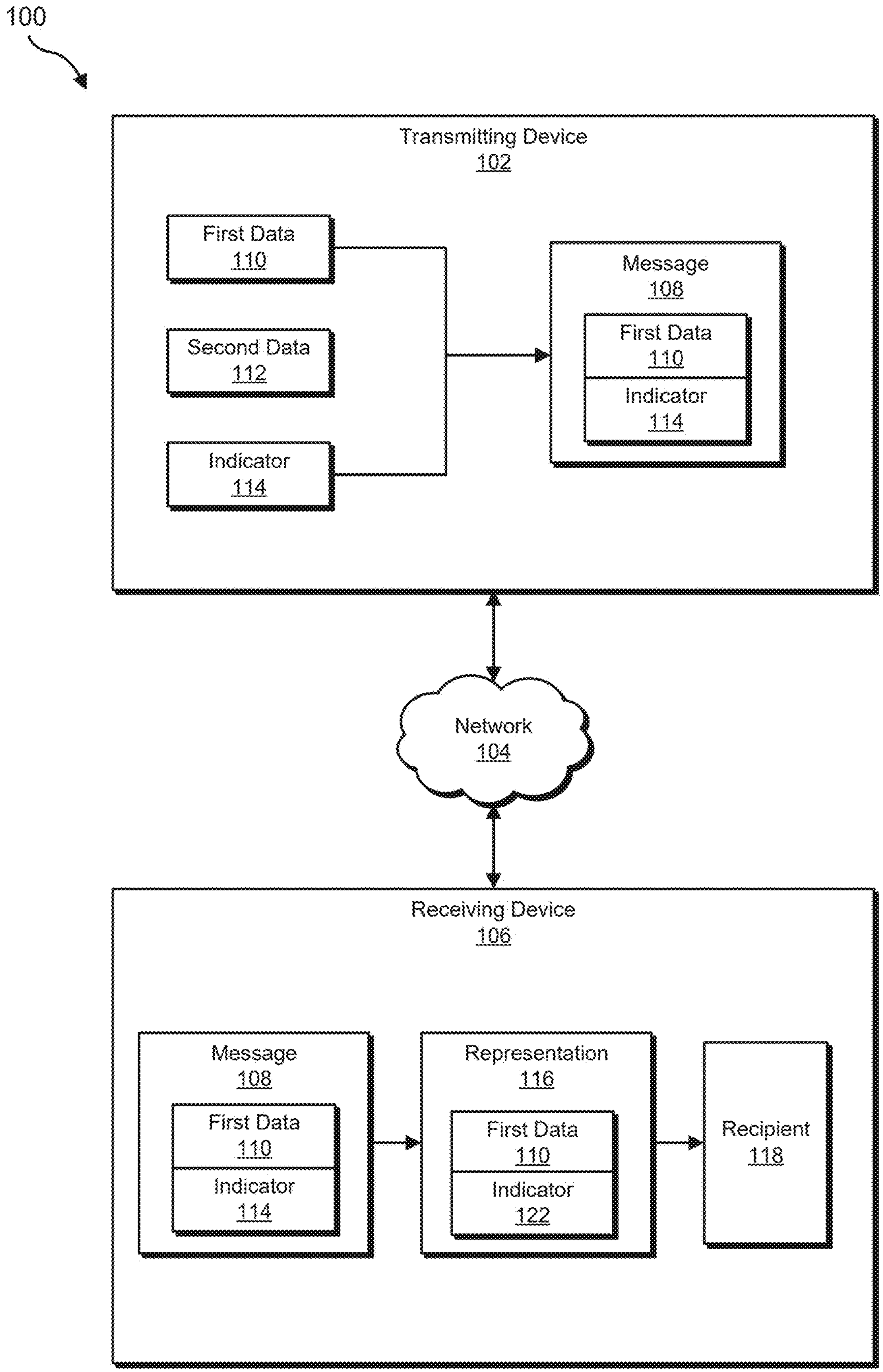
FIG. 1 is a block diagram of an example system for transmission of data.

Throughout the drawings, identical reference characters and descriptions indicate similar, but not necessarily identical, elements. While the examples described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

Described herein are various embodiments of systems and methods for data transmission. As will be described in greater detail below, systems and methods for transmitting and processing data can use representations of data portions (e.g., blocks, chunks, or other subunits of data) that match a specified pattern, such as zero gradients in a machine learning training algorithm or activation data that follows a predetermined pattern. These representations can allow different parts of a system to communicate the existence of these data portions to each other without actually transmitting the data portions while also allowing for the transmission of data portions that do not match the specified pattern. Processing of data can also use these representations or indicators as placeholders for the omitted data and perform calculations based on tallies, skipped memory locations, or other ways of accounting for the omitted data. This can in some cases reduce computing resources used to process data, such as data that may have been communicated using such representations.

Some modern computing systems, such as machine learning model training and/or optimization systems, transfer very large volumes of data. Many massively parallel systems, for example, transmit large volumes of data from one computing unit or system to another. As a specific example, some machine learning model training systems use many parallel worker units to train a machine learning model, coordinated by an aggregator and/or worker manager that takes training results or other data, process the data into model updates, and propagates the updates back out to the workers. The volumes of data transferred during this training process can be very large (such as 12PB of data transferred during a roughly 350 hour training session across 196 worker units) and accordingly require significant amounts of time to transfer even over high bandwidth network links.

In some cases, as will be described in greater detail below, systems such as the machine learning (ML) training and/or optimization systems can communicate data in discrete blocks that represent results of an iteration of training. These discrete blocks can contain, for example, a gradient, activation data, or other representation of a change in the parameters of the machine learning model recorded by a given worker during a given iteration. The inventors have recognized and appreciated that, in some cases, this can include data that is substantially identical. For example and in the case of gradients, the data of one gradient can contain the identical (or nearly identical) data as another gradient. Even in cases where the data is not identical, transferred data can often match predetermined criteria. For example, gradients for a particular training iteration of a machine learning model may indicate "no change" to the parameters of the ML model during the training iteration and transferred data in each gradient might be all zeroes.

Data transfer times can take up a significant fraction (in some cases, up to 70%) of the overall training session time. These data transfer times can slow down the overall data processing capabilities of the system, particularly when the data transfer times are significantly longer than the time needed to perform compute operations on the data. The length of data transfer time that does not overlap with time spent performing compute operations is sometimes referred to as "exposed" data transfer time.

While some approaches involving application of data compression algorithms to the data before transmission can reduce the overall volume of data that needs to be transferred, these approaches can introduce processing latency (i.e., the time required to compress or encode the data at the transmitting device, and then decompress or decode the data at the receiving device) that negates any overall time savings gained from reducing the volume of data transferred.

Some embodiments described herein include systems and/or methods for reducing the overall volume of raw, uncompressed data that must be transferred over the network to reduce the total amount of exposed data transfer time. In some cases, some systems and methods herein can reduce the number of compute operations needed to be performed by performing a generic tally or register increment rather than a full compute operation on data portions that meet certain criteria, such as zero-gradients (e.g., gradients that include only zero values) or identity matrices. The systems and/or techniques described herein may be implemented as part of a device such as a central processing unit (CPU), including a specific core and/or chiplet of a multi-die package. Additionally or alternatively, one or more of the techniques and/or systems described herein can be implemented as part of a graphical processing unit (GPU), field-programmable gate array (FPGA), neural processing unit (NPU), tensor processing unit (TPU), combinations of one or more of the same, and/or any other suitable hardware for transmitting and/or receiving data in a sparsity aware fashion. In some embodiments, one or more of the systems and/or techniques can be implemented using a collection of processing units, each being a circuit (e.g., single-instruction, multiple-data (SIMD) units and/or single-instruction, multiple-thread (SIMT) units), that can perform parallel (e.g., synchronous) execution of work-items. Such circuits may, in some implementations, form a part of a larger computer system, including one physical computing device that includes the circuits interconnected (e.g., via one or more buses) with other components such as memory or other storage, display adapters and/or display devices, network adapters, and other elements of computing devices. Such physical computing devices may in some cases be a part of a larger computer system, such as an interconnected set of devices (e.g., connected by a network or other fabric), such as a data center or other distributed computing system, that may communicate and/or collaborate to perform tasks.

In some embodiments, one or more of the techniques described herein (including one or more of the circuits described herein) may be implemented as part of a network switch or smart network interface card ("SmartNIC").

Such a network switch may include multiple physical network interfaces and be configured to, using one or more network protocols, communicate network traffic between the physical network interfaces to communicate data between network nodes available via the different interfaces. In some such implementations, a network switch may, in addition to other network adapter components such as physical network interfaces, registers, internal interconnect fabric, and other elements, one or more circuits to perform operations on data, such as data that is received from or is to be transmitted to the network, such as data to be included in a payload of one or more network messages. Such circuits to perform operations on data may include the foregoing examples of circuits, including FPGAs, GPUs, CPUs, NPUs, TPUS, and/or other circuits, and such circuits may be adapted to perform techniques described herein and/or other data processing operations.

Such a SmartNIC may, in some implementations, be a network adapter for a host computing device (a computing device that hosts the SmartNIC) that couples the host computing device to one or more networks and is able to communicate network traffic between the network and the host computing device. In some such implementations, the SmartNIC may, in addition to other network adapter components such as a physical network interface, registers, a bus interface for the host computing device (e.g., a peripheral component interconnect (PCI) bus), and other elements, one or more circuits to perform operations on data, such as data that is received from or is to be transmitted to the network, such as data to be included in a payload of one or more network messages. Such circuits to perform operations on data may include the foregoing examples of circuits, including FPGAs, GPUs, CPUs, NPUs, TPUS, and/or other circuits, and such circuits may be adapted to perform techniques described herein and/or other data processing operations.

In some situations, data processing operations may include performing a large number of data processing operations on a large number of sets of data, which may in some cases include performing the same instruction or a small number of instructions repeatedly across data sets. In some situations, this may include processing data as part of an artificial intelligence operation such as a machine learning operation. This could include processing input data with a model or processing data to train a model. As another example, computational fluid dynamics (CFD), partial differential equations (PDEs), graph algorithms, or other operations to be performed, including in the context of high performance computing, may include performing a large number of data processing operations on a large number of sets of data. Such operations may include matrix multiplication operations (GEMM), convolution operations, or other mathematical or logical operations The "sparsity" of data may relate to a degree to which gradients or other representations of the results of a training iteration contain data that matches specific criteria (e.g., ML training gradients that contain all zero values, all near-zero values, identity matrices, null matrices, or data blocks that match some other specified pattern). "Sparse data" may be data blocks, chunks, portions, or other subdivisions that match criteria for sparsity. One example of sparse data includes machine learning training gradients containing all zero values. An additional example of sparse data includes machine learning training gradients where each value in each gradient is within a specified set of values, such as between zero and a threshold value (e.g., can be approximated or rounded to a zero value), though any suitable value range could be used.

A transmission protocol that accounts for such data sparsity can transmit an indicator of these gradients rather than the entirety of the data itself, omitting the data from the transmission and reducing the overall size of the network transmission. Although the examples described herein discuss transmitting gradients and/or other matrices of data, these systems and methods can work with a variety of information, such as ML learning activation data or any other kind of collective data.

Omitting sparse data from data transmissions in this way can in some cases confer benefits to a massively parallel system such as an ML training system. First, the total volume of data being transferred is reduced, thereby speeding up data transmission. Second, because the volume of data being transferred is reduced by omitting sparse data, the system no longer needs to rely on data compression algorithms in order to efficiently transmit the data; the gradients or other data can be transmitted in raw form, thereby removing processing times for encoding and/or decoding data. Furthermore, omitting sparse data while preserving transmission of dense (i.e., nonzero or nonidentical data chunks) can allow the system to seamlessly respond to changes in data sparsity over time.

With respect to processing of exchanged data, worker managers and aggregators that are capable of using a sparsity-aware communication protocol such as the one described herein can avoid performing full compute operations (e.g., processing via an arithmetic logic unit or ALU) on sparse data, reserving that processing capability for data units that require such processing to be properly aggregated. In some cases, elements of sparse data (e.g., that meet set criteria) can be handled in a preconfigured manner. As one specific example, an ML training system performing a gradient descent training of an ML model might need to average training gradients received from workers. In this situation, gradients that contain all zero values might only contribute to the average by incrementing the total number of gradients processed and can be handled with a simple value increment or tally at the end of the aggregation process rather than being incorporated into the summation of gradient values.

Workers described herein may represent instructions executing on one or more computing devices configured to perform operations, such as in a distributed processing system. For example, in the example of a machine learning training system, a worker can be configured to execute a portion of a process of training a machine learning model where other workers are performing other portions, or to execute a training process on a model that is to be combined with other models being trained by other workers, using input training data and report results of the execution to another device, such as a worker manager or aggregator.

Worker managers described herein may represent instructions executing on one or more computing devices such as servers, which perform operations to manage one or more workers. In some examples, a worker manager can allocate or de-allocate workers from specific tasks, such as a portion of a machine learning training job. In some examples, a worker manager can also be responsible for coordinating transmission of data output by workers to destinations, such as to an aggregator.

Aggregators described herein may represent instructions executing on one or more computing devices and/or systems configured to receive and summarize data received from other sources. For example, an aggregator can be configured to receive data or other messages from workers and output an aggregate result. In further examples, an aggregator can receive and process aggregation results from other aggregators.

Hardware and/or design of an aggregator can receive transmissions with omitted data and use information such as specialized indicators to identify sparse gradients so that any mathematical processing or aggregation of incoming data accounts for the omitted data chunks. Processing data in this way likewise confers important benefits to systems such as ML training systems. For example, because the data does not need to be algorithmically compressed in order to be efficiently transmitted, the aggregator is not required to spend compute time decompressing the data. Additionally, by processing an indicator of a data chunk or gradient omitted from a data transmission rather than the entire data chunk or gradient, the aggregator can skip over all or a portion of the compute time that would have otherwise been spent processing the data chunk or gradient, thereby improving the overall computing efficiency of the aggregator. Furthermore, specialized sparsity-aware computing systems can include compute units configured to provide an output indicating whether a particular computational result represents sparse data or not. In some embodiments, spare representation of a result can be derived from sparse representations of received data. This information can then be used when transmitting results, updates, or the like back out to workers without needing to perform complex analysis on a particular set of computational results.

While the examples for data transmission provided herein generally refer to ML training, ML training systems, and the like that communicate updates to an ML model in terms of gradients, the principles herein can be applied to any situation in which data sparsity occurs. The term "data sparsity" as used herein and as mentioned above refers to a situation in which multiple data chunks of a specified size (e.g., an ML gradient) are identical (e.g., contain all the same values) and contain a preidentified value (e.g., the ML gradients contain all zero values, all near-zero values, and/or other values that match predetermined criteria). A degree of sparsity in a given dataset refers to a quantity or percentage of identical data blocks. For example, a sparse data set might contain more than 10%, more than 20%, more than 30%, or any other threshold percentage of sparse (i.e., identical) data. In one particular example, a sparse data set can include machine learning training gradients where at least a subset of the gradients contain all zero values or all near-zero values. By contrast, "dense" data may refer to data sets that do not include sparse data and/or are transmitted without omitting any data.

The term "job" may refer to a unique sequence of operations or tasks. For example, a job can represent a combination of process_group, epoch, iteration, and/or gradient bucket_id in a PyTorch Distributed Data Parallel setup to uniquely represent a specific collective operation such as an AllReduce or other aggregation and/or reduction operation. A job can be broken down into a collection of tasks. Each task may be associated with a particular segment of data. A segment may be a portion of data related to the job, and the size of a segment may be defined by the size of internal data buffers of one or more systems configured to process data related to the job, as will be described in greater detail below.

The following will provide, with reference to FIGS. 1-7, detailed descriptions of example systems and methods for transmission of data. Detailed descriptions of example hardware aggregator systems and associated methods will be provided in connection with FIGS. 8-11.

In some examples, a method for data transmission can include receiving, via a network and by at least one receiving device, at least one message that includes first data to be provided to at least one recipient at the at least one receiving device. The at least one message can also include an indicator of second data that was omitted from the at least one message. In response to receiving the at least one message and based on the indicator of the second data, the receiving device can analyze the at least one message to identify the second data. Based on analyzing the message, the receiving device can generate a representation of an original data payload. This representation can include the first data as well as an identification of the second data that was omitted from the at least one message. The receiving device can then provide the representation of the original data payload to the at least one recipient at the receiving device.

In some examples, the transmitting device can be one or more workers of a machine learning training system. In these examples, the receiving device can be an aggregator of the machine learning training system. The first data can include a first subset (e.g., a non-sparse subset or non-identical subset) of training gradients generated by the worker(s), and the second data can include a second subset (e.g., a sparse subset) of training gradients generated by the worker(s).

In some embodiments, the second data includes blocks of data that match a specified pattern. In these embodiments, the specified pattern can include (i) a machine learning training gradient that includes data of a specified value (e.g., a zero gradient), (ii) a machine learning training gradient comprising data within a specified range of values; (iii) an identity matrix, and/or (iv) a null matrix. Additionally or alternatively, the second data can include blocks of data that each include identical data.

In some examples, the indicator of the second data can indicate that no data has been omitted from the at least one message. In these examples, providing the representation of the original payload includes providing the first data and an indication that no data was omitted from the message.

In further examples, the indicator of the second data can indicate that all payload data has been omitted from the at least one message. In these examples, providing the representation of the original payload can include providing a representation of the second data as well as an indication that all payload data was omitted from the message.

In some embodiments, each transmitted message can include (i) a transmission control header, (ii) a header segment that includes the indicator of the second data as well as a payload presence encoding that indicates whether a given portion of payload data is included in a payload of the message, and (iii) the payload of the message, which includes portions of payload data indicated as present by the header segment. Each of these portions of data includes a non-overlapping subset of the first data. Additionally or alternatively, the header segment can include a portion size parameter that defines a data size of the portions of payload data.

In some embodiments, a system for data transmission can include at least one receiving device that is configured to receive messages via a network. The system can also include a transmitting device that divides a data payload that is to be transmitted to the at least one receiving device into a first data and a second data. In these embodiments, the second data includes data that matches one or more criteria. The transmitting device can also generate, based at least in part on dividing the data payload, at least one message that includes the first data and omits the second data. Such a message can include the first data as well as an indicator of the second data omitted from the message. The transmitting device can then transmit, via the network and to the at least one receiving device, the message.

In these embodiments, dividing the data payload can include dividing the data payload into a collection of compute parts, where each compute part represents a quantity of data that can be processed in a single step of processing by the receiving device. Each message can thus include a subset of the compute parts.

In some examples, the transmitting device of the above-described system can include a worker from among a group of workers of a machine learning training system. In these examples, the receiving device can be an aggregator of the machine learning training system. The first data can include a first subset of training gradients generated by the worker, and the second data can include a second subset of training gradients generated by the worker.

In some embodiments, an additional method for data transmission can include dividing a data payload that is to be transmitted to the at least one receiving device into a first data and a second data. In these embodiments, the second data includes data that matches one or more criteria. The method can also include generating, based at least in part on dividing the data payload, at least one message that includes the first data and omits the second data. In these embodiments, such a message can include the first data and an indicator of the second data. The method can also include transmitting the at least one message to the at least one receiving device over a network.

In some examples, a method for processing of data can include (i) receiving, by at least one receiving device, first data and an indicator of second data that was transmitted in at least one message from at least one transmitting device, the second data being omitted from the at least one message; (ii) in response to receiving the at least one message and based on the indicator of the second data, generating a representation of an original data from the at least one transmitting device, the original data including the first data and the second data; and (iii) processing, by the at least one receiving device, the representation of the original data, wherein the processing consists of (a) performing one or more operations that use the first data as an input; (b) refraining from performing the one or more operations using the second data as an input; (c) performing at least one aggregate operation based at least in part on a result of performing the one or more operations on the first data and on a quantity of the second data that was omitted from the at least one message; and (d) storing a result of the at least one aggregate operation.

In some embodiments, the original data can include a collection of training gradients for a distributed machine learning system. In these embodiments, the transmitting device can include at least one worker of the distributed machine learning system and the at least one receiving device can include an aggregator that aggregates training gradients received from workers of the distributed machine learning system. Furthermore, performing the one or more operations that use the first data as an input can include processing the training gradients that are included in the first data. In these embodiments, the above-described method can also include calculating an offset value to account for the training gradients included in the second data that were omitted from the at least one message. Performing the at least one aggregate operation in these embodiments can include performing the at least one aggregate operation based on the result of processing the training gradients included in the first data and the offset value that accounts for the training gradients included in the second data that were omitted from the at least one message, and the method can further include transmitting, to the at least one worker, a gradient update based on the result of the at least one aggregate operation.

In some examples, performing operations using the first data as an input can include (i) evenly distributing the training gradients included in the first data to a group of compute elements of the at least one receiving device, and (ii) performing the one or more operations using the first data by performing the one or more operations across the group of compute elements.

Additionally or alternatively, the above-described method for processing transmitted data can include tracking, based on the indicator of the second data, a quantity of second data omitted from the at least one message. In these examples, tracking the quantity of second data omitted from the at least one message can include incrementing, based on the indicator of the second data, a register that tracks the quantity of second data omitted from the at least one message. In further examples, the above-described processing method can include tracking the quantity of second data omitted from the at least one message by shifting, based on the indicator of the second data, a storage location in memory of an output of the one or more operations.

In some embodiments, the above-described method for processing transmitted data can include transmitting, from the at least one receiving device to the at least one transmitting device, prior to receiving the at least one message, a segment size parameter that indicates a number of portions of data that can be simultaneously processed by the at least one receiving device.

In some examples, performing the one or more operations that use the first data as input can include performing a mathematical operation indicated by a header of the at least one message.

In some embodiments, the above-described method for processing transmitted data can include transmitting, by the at least one receiving device, a result of processing the at least one message to the at least one transmitting device.

In further embodiments, the indicator of the second data can include a volume of data that is less than a volume of data of the second data.

In some examples, a system for processing transmitted data can include (i) a network interface that receives first data and an indicator of second data that was transmitted in at least one message from at least one transmitting device, the second data being omitted from the at least one message; (ii) a generating component that, in response to receiving the at least one message and based on the indicator of the second data, generates a representation of an original data from the at least one transmitting device, the original data comprising the first data and the second data; (iii) at least one physical processor that processes the representation of the original data by: (a) performing one or more operations using the first data as an input; (b) refraining from performing the one or more operations using the second data as an input; and (c) performing at least one aggregate operation based at least in part on a result of performing the one or more operations on the first data and on a quantity of the second data that was omitted from the at least one message. The system can also include a physical memory that stores a result of the at least one aggregate operation. This system can also implement one or more steps of the above-described method for processing transmitted data.

In some embodiments, a non-transitory computer-readable medium can include one or more computer-readable instructions that, when executed by at least one physical processor of a computing device, cause that computing device to (i) receive first data and an indicator of second data that was transmitted in at least one message from at least one transmitting device, the second data being omitted from the at least one message; (ii) in response to receiving the at least one message and based on the indicator of the second data, generate a representation of an original data from the at least one transmitting device, the original data comprising the first data and the second data; (iii) process the representation of the original data by: (a) performing one or more operations using the first data as an input; (b) refraining from performing the one or more operations using the second data as an input; (c) performing at least one aggregate operation based at least in part on a result of performing the one or more operations on the first data and on a quantity of the second data that was omitted from the at least one message; and (d) storing a result of the at least one aggregate operation.

In some embodiments, a method for efficient data transmission can include (i) receiving a request to perform aggregation of a data segment, the data segment including data to be aggregated; (ii) obtaining a collection of data portions, each data portion including a non-overlapping subset of the data segment; and (iii) performing aggregation operations on the collection of data portions in the order in which the data portions were obtained.

In some examples, performing the aggregation operations on the collection of data portions can include assigning a data portion in the collection of data portions to a compute unit of a computing array that includes a collection of compute units. In some specific examples, assigning the data portion to the compute unit can include determining that the compute unit is in an idle state and removing the compute unit from the idle state. In these examples, the method can include returning the compute unit to the idle state in response to determining that the compute unit has completed performing aggregation operations on the data portion.

In some embodiments, the method can include assigning the data segment to the compute unit. In these embodiments, assigning the data portion to the compute unit can include determining that the data segment is assigned to the compute unit. The compute unit can include a collection of temporary data storages; and performing the aggregation operations on the data portion can include storing results of performing aggregation operations on the data portion to the temporary data storage associated with the data segment.

In some examples, the method can include assigning a second data segment to the compute unit In these examples, the method can also include obtaining a second data portion that represents a portion of the second data segment, assigning the second data portion to the compute unit based on determining that the second data segment is assigned to the compute unit, performing aggregation operations on the second data portion, and storing results of performing aggregation operations on the second data portion to a temporary storage associated with the second data segment.

In some embodiments, the data segment can represent a subset of data to be processed as part of fulfilling a data processing job. In these embodiments assigning the data segment to the compute unit can include determining that a current number of compute units assigned to process data segments that are part of the data processing job is below a threshold number.

In some examples, obtaining the collection of data portions can include obtaining the collection of data portions from a network. In these examples, performing the aggregation operations on the data portions can include performing the aggregation operations on the data portions in the order in which the data portions were obtained from the network.

In some embodiments, data segment can include machine learning training activations and/or machine learning training gradients.

In some examples, a system can include (i) resource coordination circuitry that is configured to receive incoming messages, the incoming messages each including a data payload that represents a portion of a data pertaining to a task; and (ii) a compute array that includes a collection of compute units, each compute unit being configured to process data payloads. In these examples, the resource coordination circuitry can be configured to assign an incoming task to a compute unit in the collection of compute units and direct a data payload pertaining to the task to the compute unit without waiting to receive other messages including data payloads pertaining to the task.

In some embodiments, the resource coordination circuitry can be configured to assign the incoming task to the compute unit based on determining that the compute unit is represented in an idle pool of compute units. In these embodiments, the resource coordination circuitry can be further configured to remove the compute unit from the idle pool in response to directing the data payload to the compute unit. Additionally or alternatively, the resource coordination circuitry can be configured to return the compute unit to the idle pool in response to receiving a signal from the compute unit indicating that the compute unit has completed processing the data payload.

In some examples, the resource coordination circuitry can be configured to detect that a new compute unit has been added to the collection of compute units; and assign a second incoming data payload to the new compute unit. In in these examples, each compute unit in the collection of compute units can include a collection of temporary data storages, and assigning the task to the compute unit can include associating the task with a temporary data storage in the collection of temporary data storages. Processing the data payload can include storing results of performing aggregation operations on the data payload to the temporary data storage associated with the task.

In some embodiments, a method can include (i) obtaining a collection of data portions, each data portion including a non-overlapping subset of a data segment including data to be processed; and (ii) for each data portion in the collection of data portions: (a) identifying a compute unit that is represented in a pool of idle compute units; (b) assigning the data portion to the compute unit; (c) removing the compute unit from the pool of idle compute units in response to assigning the data portion to the compute unit; and (c) returning the compute unit to the pool of idle compute units in response to determining that the compute unit has completed processing the data portion.

In some examples, the method can include assigning the data segment to the compute unit. In these examples, identifying the compute unit can include determining that the data segment is assigned to the compute unit. Additionally or alternatively, assigning the data segment to the compute unit can include determining that a current number of compute units assigned to process data segments is below a threshold number. In some embodiments, the compute unit can be part of a compute array. In these embodiments, the method can include modifying the threshold number in response to detecting a change in a number of compute units in the compute array.

In some embodiments, the method can include assigning the data portion to the compute unit before receiving all data portions in the collection of data portions.

FIG. 1 is a block diagram of an example system 100 for transmission and processing of data in a distributed system. As illustrated in this figure, example system 100 can include a transmitting device 102 in communication with a receiving device 106 over a network 104. As will be described in greater detail below, transmitting device 102 and receiving device 106 can be components of a distributed machine learning system in which an aggregator receives and aggregates training information from a number of workers and distributes machine learning model updates back to the workers after each training round. Transmitting device 102 can divide a set of data that is to be transmitted to receiving device 106 into first data 110 and second data 112. In some embodiments, second data 112 can consist of sparse data, which will be described in greater detail below. Transmitting device 102 can then generate a message 108 that includes first data 110 and an indicator 114 that serves as an indicator of second data 112. Transmitting device 102 can transmit message 108 to receiving device 106 via network 104. In some embodiments, indicator 114 can include indications of both the first data and the second data. Specific examples (such as presence encodings and other header fields and/or structures) will be described in greater detail below.

Receiving device 106 can process, based on first data 110 and indicator 114, message 108 into a representation 116 of the original data set that transmitting device 102 divided into first data 110 and second data 112. Representation 116 can include first data 110 as well as an indicator 122 of second data 112 that is based on indicator 114 in message 108. In some embodiments, indicator 122 can provide indications of the presence of both first data 110 as well as second data 112, as will be described in greater detail below. Receiving device 106 can then pass representation 116 to one or more recipients, illustrated here as recipient 118, for data processing (e.g., aggregation). Specific examples of receiving device 106 will be described in greater detail below with respect to FIGS. 9-11.

Network 104 generally represents any medium or architecture capable of facilitating communication or data transfer. In one example, network 104 can facilitate communication between transmitting device 102 and receiving device 106. In this example, network 104 can facilitate communication or data transfer using wireless and/or wired connections. Examples of network 104 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1. Conversely, all of the components and devices illustrated in FIG. 1 need not be present to practice the implementations described and/or illustrated herein. The devices and subsystems referenced above can also be interconnected in different ways from that shown in FIG. 1. System 100 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, can generally refer to any form of device or medium capable of storing or carrying computer-readable instructions. Examples of computer-readable media include non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 2:
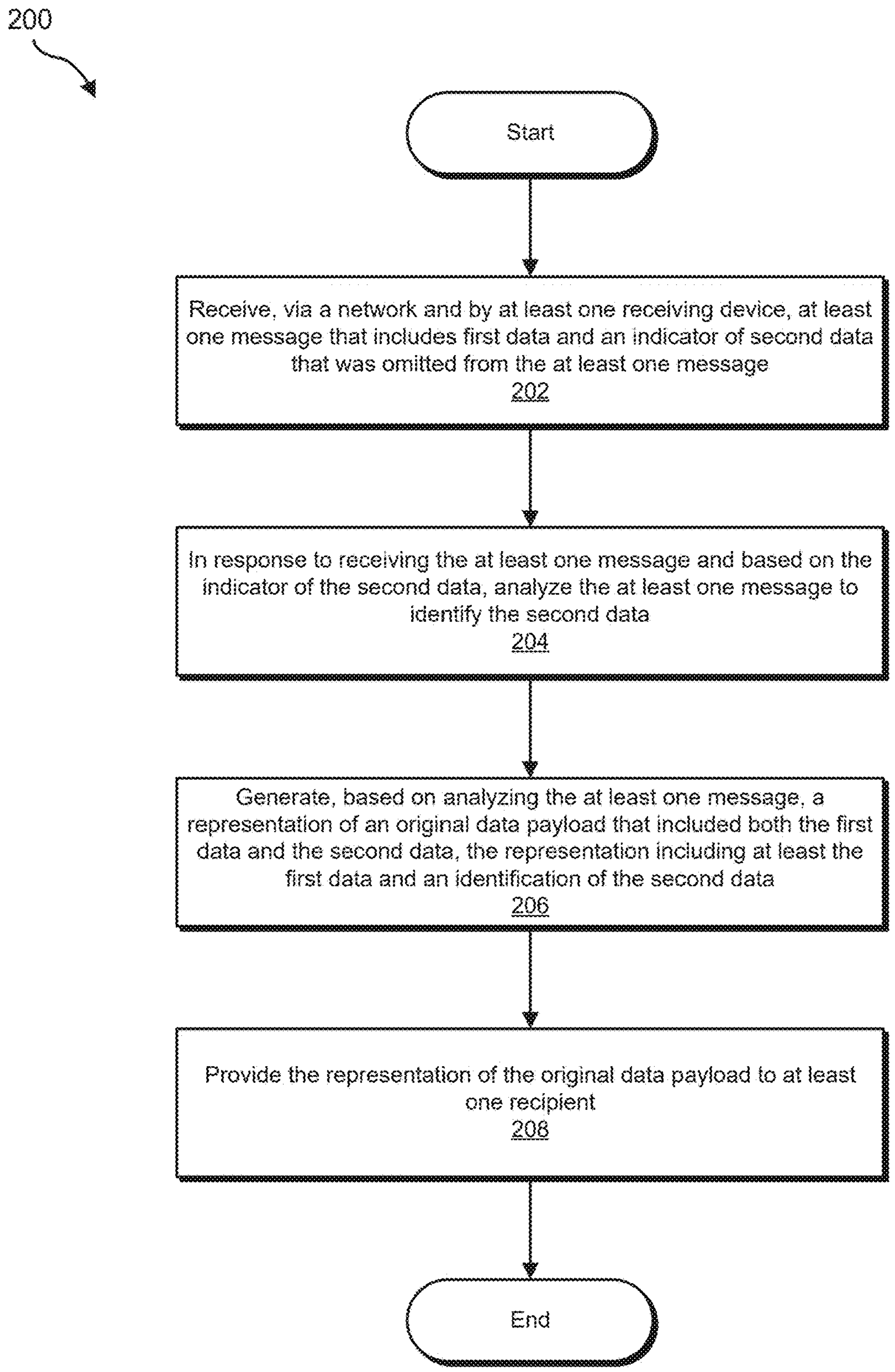
FIG. 2 is a flow diagram of an example method for transmission of data.
Figure 11:
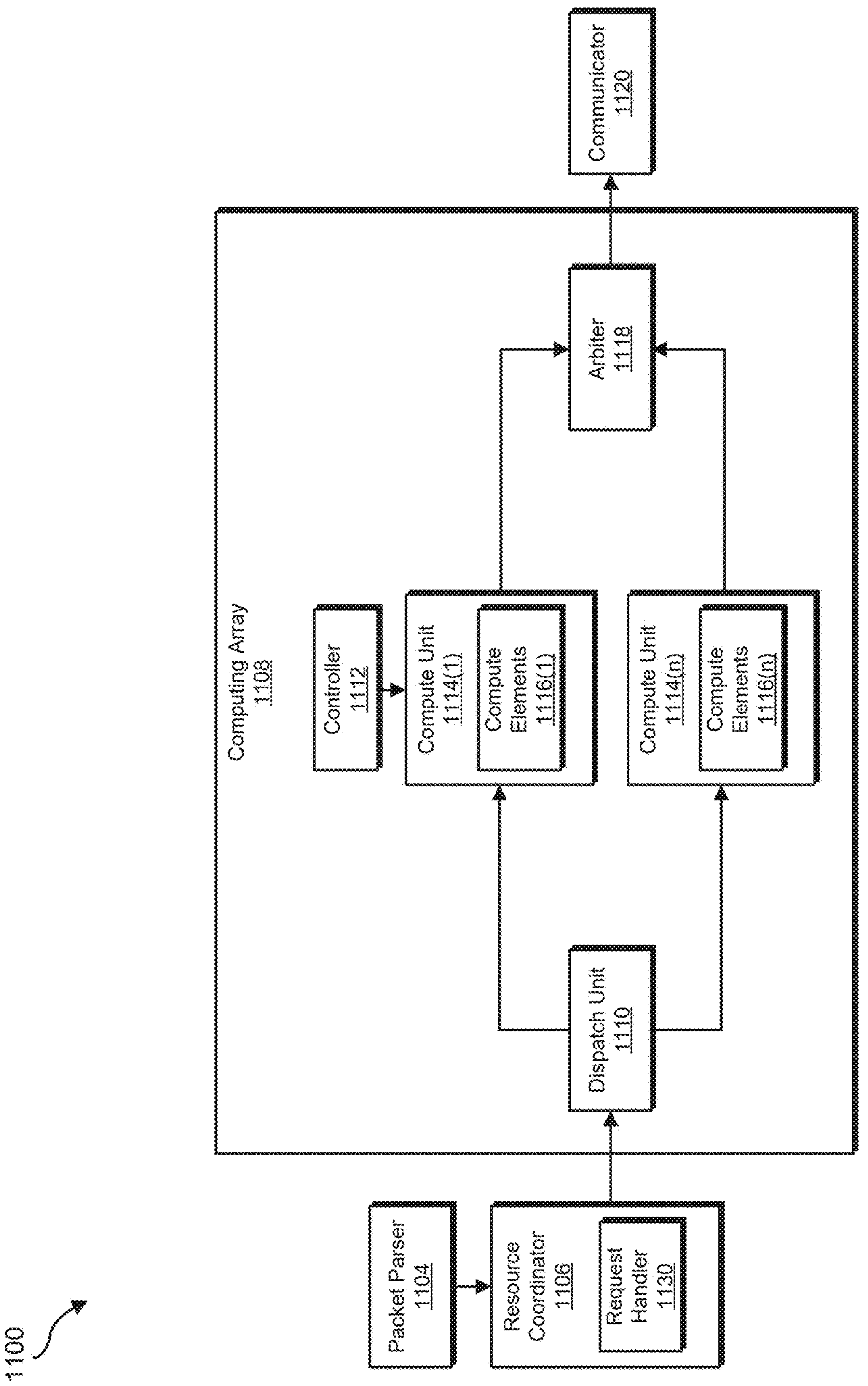
FIG. 11 is a block diagram of an example aggregation system for aggregating data using some principles described herein.

FIG. 2 is a flow diagram of an example computer-implemented method 200 for data transmission The steps shown in FIG. 2 can be performed by any suitable computer-executable code and/or computing system, including system 100 in FIG. 1, system 1100 in FIG. 11, and/or variations or combinations of one or more of the same. In one example, each of the steps shown in FIG. 2 can represent an algorithm whose structure includes and/or is represented by multiple sub-steps, examples of which will be provided in greater detail below.

At step 202 of the method illustrated in FIG. 2, a device can receive, via a network, at least one message that includes first data and an indicator of second data that was omitted from the at least one message. Examples and detailed descriptions of such messages are provided in connection with FIGS. 4-6. As one particular example, transmitting device 102 in system 100 can convert second data 112 into indicator 114 and assemble a message 108 that includes first data 110 and indicator 114, and transmit message 108 over network 104 to receiving device 106. In some embodiments, transmitting device 102 may incorporate information into indicator 114 that specifies relative positions of the first and second data within a data series, e.g., as an encoding as will be described in greater detail below.

The systems and methods described herein may identify second data 112 in a variety of ways. In some embodiments, second data 112 may include blocks, chunks, portions, or other subdivisions of data that match predetermined criteria and/or include identical or nearly identical data. For example, second data 112 may include subdivisions of data that all include the same value, the same pattern of values, and/or values within a specified range. Some specific examples of data that may be identified as second data 112 include machine learning training gradients with all zero values, machine learning training gradients with all near-zero (e.g., within a certain threshold of zero) values, machine learning training gradients that include data within a specified range of values, identity matrices, null matrices, and/or any other representation of data that matches a specific pattern that can be identified at a receiving device.

Figure 3:
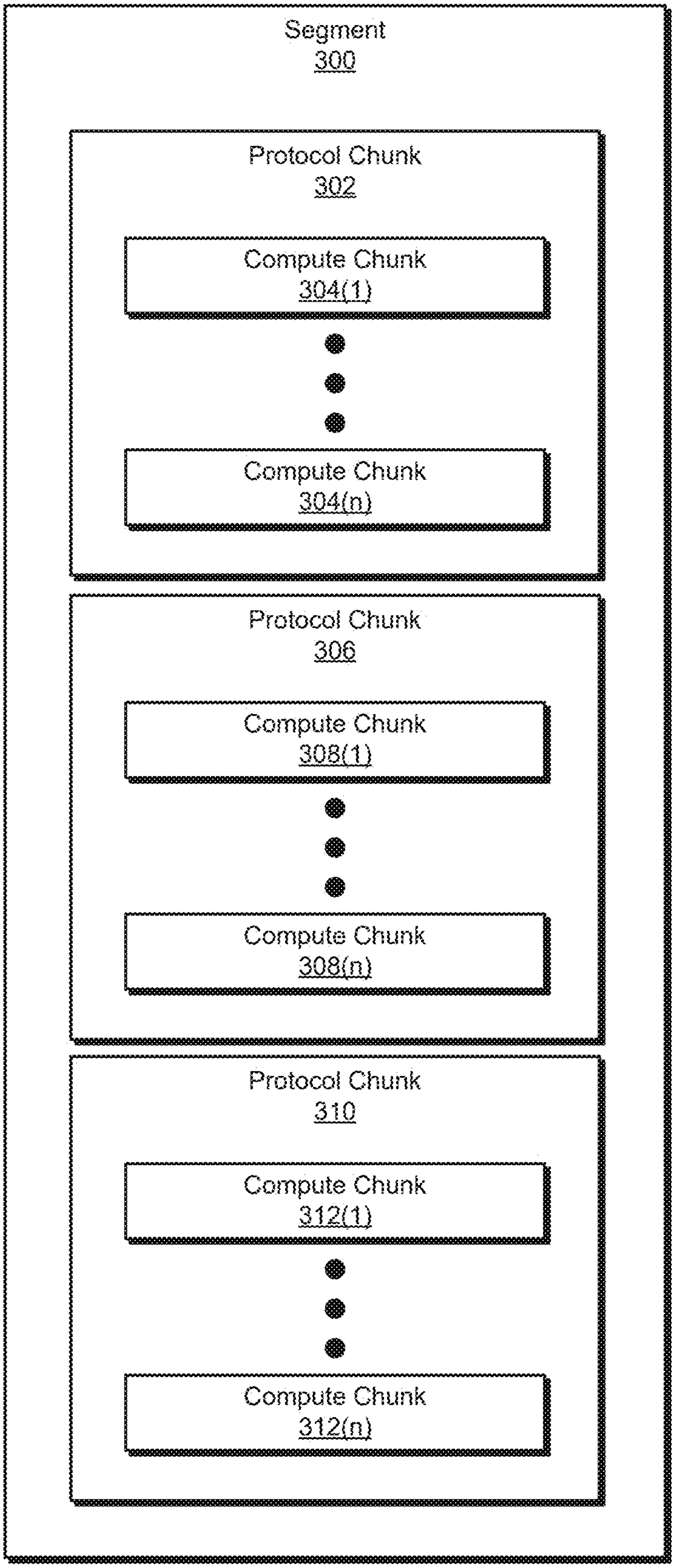
FIG. 3 is a block diagram of an example segmentation of data for transmission.

FIG. 3 is a block diagram of an example segmentation of data for transmission of data. As illustrated in FIG. 3, a segment of data (which will be described in greater detail below and is illustrated as segment 300) can be subdivided into a group of protocol chunks. In this case, segment 300 is divided into protocol chunks 302, 306, and 310.

As described in the example of FIG. 3, a sparsity-aware communication protocol can use hierarchical segmentation of data to facilitate efficient data transmission. For example, a machine learning training system can include a number of workers that report training results in the form of gradients to one or more aggregators. Rather than sending training result gradients one at a time, a set of workers might perform a number of training sessions on a machine learning model and transmit batches of gradients in a single transmission.

For example, gradients can be grouped into compute chunks, with each compute chunk representing a number of discrete units of data (e.g., machine learning gradients) that can be processed in a single step, clock cycle, instruction, or other discrete single phase performed by an aggregator. These compute chunks can likewise be grouped into protocol chunks for efficient transmission. In the example of FIG. 3, these compute chunks are illustrated as compute chunks 304(1)-(*n*), 308(1)-(*n*), and 312(1)-(*n*).

Protocol chunks can represent groupings of compute chunks of configurable size, which represent groups of compute chunks and can be used to define blocks of data for transmission or omission in a sparsity-aware data communication protocol. Protocol chunks are themselves grouped into segments. The number of compute chunks in a protocol chunk can be defined in a variety of ways. In one example, the size of a protocol chunk in terms of compute chunks can be defined by the segment size divided by the number of protocol chunks configured to be sent with each message. The number of protocol chunks per message, in turn, can be configured either manually or automatically in response to expected sparsity of data. Using more protocol chunks per message adds some overhead in terms of data processing to divide and process the data but allows for more protocol chunks to be omitted from a message by virtue of containing exclusively sparse data by virtue of fewer compute chunks per protocol chunk needing to match the criteria for omission. In some embodiments, the data transmission methods described herein may adjust the sizes of protocol chunks as a machine learning training session reaches convergence and is expected to include larger volumes of sparse data. In these embodiments, the methods described herein may increase the number of compute chunks per protocol chunk as a training progresses to reduce processing overhead while still allowing for at least a threshold percentage of protocol chunks to be omitted due to the increased data sparsity. In the example of FIG. 3, segment 300 is divided into three protocol chunks, illustrated as protocol chunk 302 which includes compute chunks 304(1)-(*n*), protocol chunk 306 which includes compute chunks 308(1)-(*n*), and protocol chunk 310 which includes compute chunks 312(1)-(*n*).

Segments may represent an amount of data that can be transmitted in a single message using the sparsity-aware communication protocols described herein. A segment can be described as "sparse" if one or more protocol chunks that make up the segment are omitted from the message, while a segment is considered "dense" if all the protocol chunks that are represented by the segment are included in the message. In some examples, the size of a segment can be defined by features of the hardware aggregator or other computing device that is the designated recipient for the message that contains the segment. As a specific example, the size of each segment can correspond to the size of an internal receiving buffer of the receiving computing device. A total volume of data produced by a worker or group of workers in a machine learning training system can produce large volumes of training data which can be subdivided into segments. In some embodiments, a given segment produced by one worker can include training data for the same parallel training step performed by a different worker in the network. Aggregators can use these parallel segments to facilitate efficient data aggregation, as will be described in greater detail below. FIG. 3 illustrates a single segment, which includes three protocol chunks illustrated as protocol chunks 302, 306, and 310.

A transmission protocol can be configured to use the above features to provide efficient communications of data while minimizing the total volume of data that must be transmitted. Using the above-described segmentation scheme, a transmission protocol can send messages including header information describing the status of various protocol chunks. For example, if a protocol chunk only contains compute chunks that themselves only contain gradients with zero information, that protocol chunk can be omitted from the message and indicated as missing in a header field of messages sent using the protocol. Aggregators configured to receive such messages can then process the message to account for the missing gradients in the omitted protocol chunk.

In some embodiments, some or all of the information included in the header may be transmitted as a separate message first, followed by messages containing payload data. For example, the header of the first message may include indicator 114 and/or any other suitable indicators that may be used to identify which portions of data are included in the payload and which portions of data are not, i.e., first and second data. Some or all of the remaining messages in the set may omit some or all of this header information to reduce communication overhead, including in situations where data must be transmitted using many small messages.

At step 204 in FIG. 2, a receiving device can, in response to receiving a message and based on the included indicator of the second data, analyze the at least one message to identify the second data. For example, receiving device 106 in FIG. 1 can, in response to receiving message 108, analyze indicator 114. Furthermore, at step 206 of FIG. 2, the systems and methods described herein can generate, based on analyzing the at least one message, a representation of an original data payload that included both the first data and the second data. Continuing the example of FIG. 1, receiving device 106 can, based on analyzing indicator 114 of message 108, generate representation 116 that includes first data 110 as well as indicator 122, but does not include second data 112. This representation can include the first data as well as an identification of the second data. In some embodiments, the indicator of the second data can be included in a message header. As a specific example, a sparsity-aware transmission protocol can be built atop remote direct memory access (RDMA). A single RDMA message can include a single segment, as described above. The RDMA message can also include custom header fields (in addition to any typical L2 or RDMA header fields, such as that identify a source and/or destination of the message) for information such as operation or task codes, job IDs, segment IDs, an indicator of dense or sparse payload data, an encoding size that specifies how many protocol chunks are represented by the message, and an encoding field that indicates whether specific protocol chunks represented by the message are included in the payload or not. For example, "1" bits in the encoding may correspond to portions of first data that are included in the message payload, while "0" bits may correspond to portions of second data that are omitted from the message payload.

In one example, an RDMA message may include an indicator specifying that the message represents sparse data, an encoding size of 8, indicating that the message represents 8 protocol chunks. The encoding field may include a binary string 8 bits long specifying the status of each protocol chunk represented by the message, e.g., 10001111, indicating that the second, third, and fourth protocol chunks are sparse and therefore omitted (but still represented by) the message while the first, fifth, sixth, seventh, and eighth protocol chunks are included in the payload of the message. In the example of FIG. 1, this encoding corresponds to indicator 114: a representation of the missing protocol chunks without transmitting the protocol chunks themselves. In this particular example, the binary encoding can be used to determine the quantity and relative positions within a data series of both the first data and the second data, enabling data processing systems to determine precisely which portions of data were omitted from the payload data. Meanwhile, the protocol chunks included in the message correspond to first data 110, and those omitted from the message correspond to second data 112. In embodiments where the data to be transmitted comprises dense data, the encoding may comprise all 1 bits or otherwise provide an indication that no data was omitted from the message. As an additional example, and as will be described with regards to FIG. 5, a header can include a format field that indicates whether a message omitted no portions of data, some portions of data, or all portions of data that correspond to the message. In some examples, the header information can be sent as a separate message followed by messages including the payload data or protocol chunks.

While the preceding description describes one potential configuration for message headers, messages can use any suitable subset of these header fields. For example, certain information described could be available through other channels and therefore does not need to be included in a message header for a recipient to properly process the message. As a specific example, an aggregation system may locally store a table that stores active job IDs in association with relevant opcodes. Messages delivered to such a system can accordingly omit the opcode header field because the aggregator can determine that information based on the locally stored mapping table.

The initial configuration of the system during the initialization described below can enable a system to determine the contents of the omitted data. Of course, while the above example is directed to situations built on RDMA, any suitable underlying transmission protocol (such as UDP) can be extended using the principles described herein.

Figure 4:
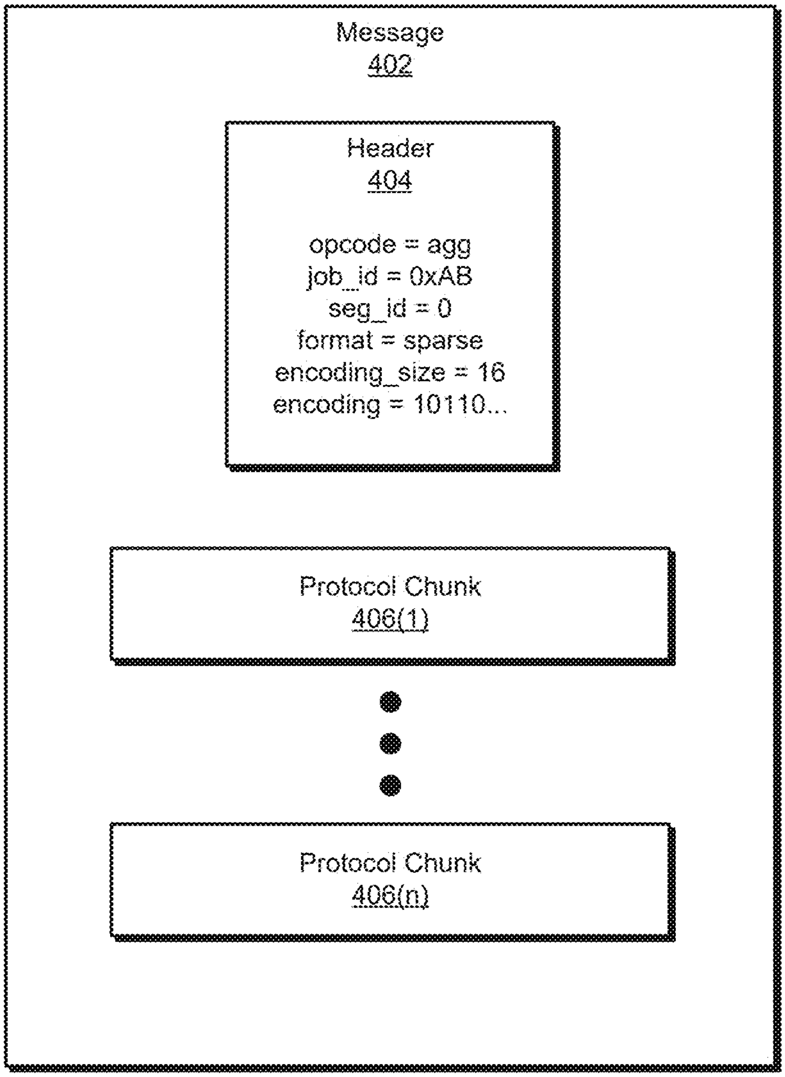
FIG. 4 is a block diagram of an example message used in transmission of data.

FIG. 4 is a block diagram of an example message formatted according to the above-described transmission method to account for sparse data. In the example of FIG. 4, a message 402 includes a header 404 as well as one or more protocol chunks, illustrated here as protocol chunks 406(1)-(*n*). Header 404 can include a variety of transmission control header fields, such as those associated with RDMA and UDP as described above. These fields can still be included in messages despite being omitted from the illustration of FIG. 4. Header 404 can also contain a variety of additional fields. In the example of FIG. 4, header 404 includes an opcode field, a job_id field, a seg_id field, a data format of the message, an encoding_size field, and an encoding field. The opcode field specifies a mathematical, aggregation, or other operation to be performed on the data included in the message. Additionally or alternatively, the opcode field can specify a type of request represented by the message. The job_id field specifies a unique sequence of operations or tasks. For example, a job_id can represent a combination of process_group, epoch, iteration, and/or gradient bucket_id in a PyTorch Distributed Data Parallel setup to uniquely represent a specific AllReduce operation. The seg_id field can represent a particular segment of data, which can be transmitted in parallel from multiple transmitting devices (e.g., workers). The format field can be used to identify a data format represented by the message. As will be described in greater detail below, messages can be formatted to represent sparse data, dense data, or empty data. The example of FIG. 4 shows a message formatted to represent sparse data. The encoding_size field indicates a number of protocol chunks included in the message, which in conjunction with the encoding field can enable a recipient device to determine which protocol chunks are present and account for any data omitted from the message during data processing. The encoding field, meanwhile, indicates which protocol chunks are present in a given message. In the example of FIG. 4, the encoding field is a binary string with a 1 at a given position indicating that the corresponding protocol chunk is included in the data payload of the message, while a 0 indicates that the corresponding protocol chunk has been omitted from the message but should still be accounted for during data processing. Protocol chunks 406(1)-(*n*) of message 402 make up the data payload portion of message 402 and are selected from the protocol chunks represented by the segment indicated in the seg_id field (in this case, segment ID 0). Protocol chunks that only include sparse data (e.g., gradients with zero values, near-zero values, and/or values matching specified criteria) are omitted from the data payload and indicated in the encoding field of header 404.

Figure 5:
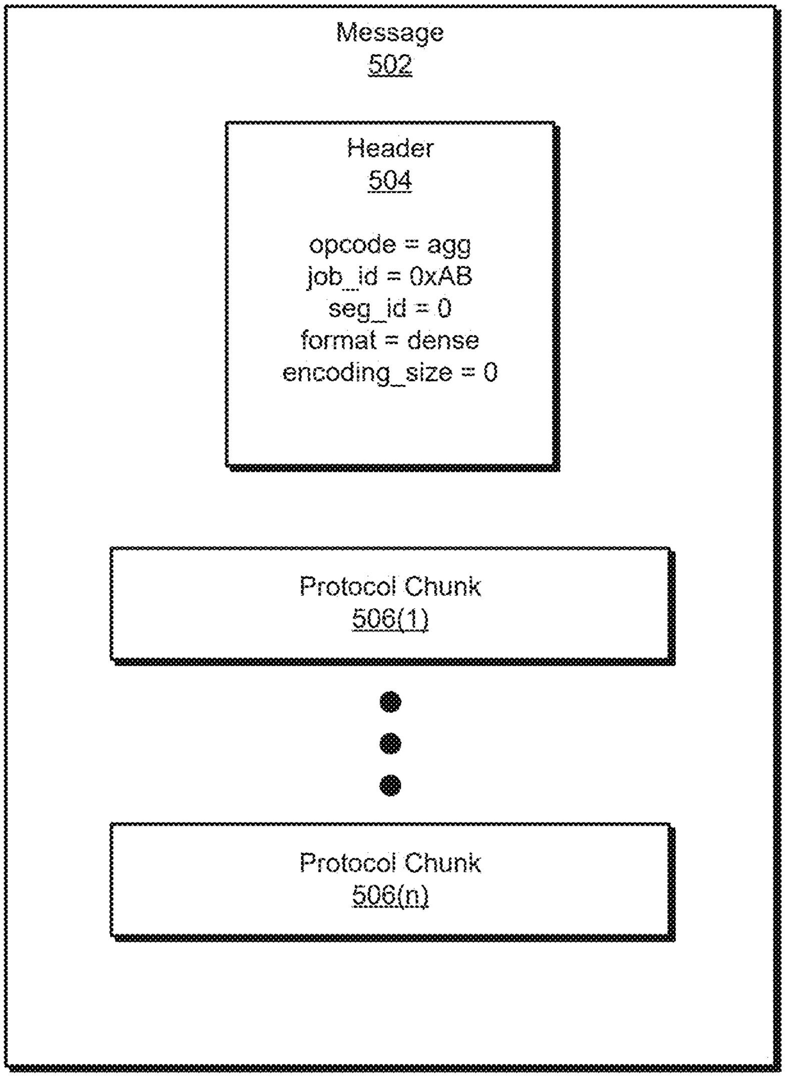
FIG. 5 is a block diagram of an additional example message used in transmission of data.

FIG. 5 is a block diagram of an example message formatted to represent dense data. As with message 402, message 502 includes headers illustrated as header 504 and an assortment of protocol chunks illustrated as protocol chunks 506(1)-(*n*). However, because message 502 is formatted to represent dense data, some fields of header 504 differ from those of header 404. In the example of FIG. 5, the format field specifies dense data and the encoding_size field is set to 0 as there is no reason to include an encoding when all protocol chunks represented by message 502 are included in the data payload by virtue of message 502 representing dense data. Because message 502 is formatted to represent a dense segment, protocol chunks 506(1)-506 (*n*), i.e., the data payload of message 502, include all of the protocol chunks (and thus compute chunks) included in the segment being transmitted in message 502 (i.e., segment 0 as indicated by the seg_id header field). In other words, message 502 provides the entirety of the original payload generated by the transmitting device with no omitted data as well as header fields that indicate no data was omitted from message 502.

Figure 6:
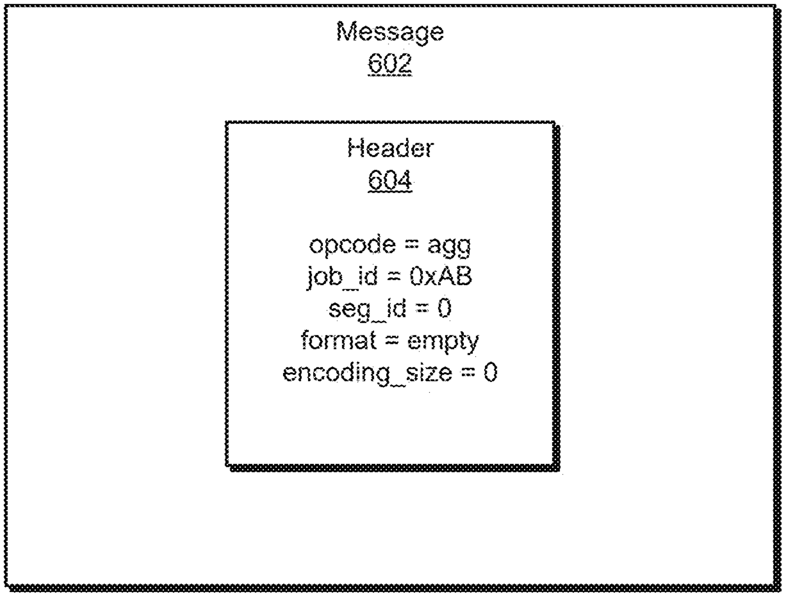
FIG. 6 is a block diagram of a further example message used in transmission of data.

FIG. 6 is a block diagram of an example message formatted to represent perfectly sparse data, i.e., a segment that only contains sparse data. In the above-mentioned machine learning training system embodiments, this might mean that every gradient represented in the segment contains only zero values. In the example of FIG. 6, message 602 (representing the sparse segment) includes a header 604 much as messages 402 and 502 contain their own headers with custom fields. However, the format header field of header 604 specifies that message 602 is configured according to the empty format and that the recipient device should assume that the entire segment indicated in the seg_id field consists of sparse data. Because every protocol chunk (and therefore compute chunk and any other associated subdivision of data) represented by message 602 contains sparse data, every single protocol chunk can be omitted from the message, thereby reducing the total volume of data transferred over the network from the transmitting device(s) to the receiving device(s) versus transmitting every segment in its entirety. Header fields related to identifying present or missing protocol chunks can optionally be omitted. In the example of header 604, the encoding_size field is still present but the encoding field has been omitted. In other words, the indicators (e.g., the header fields) of message 602 indicate that all payload data has been omitted from message 602 and that message 602 only includes a representation of the second (i.e., omitted) data.

Figure 7:
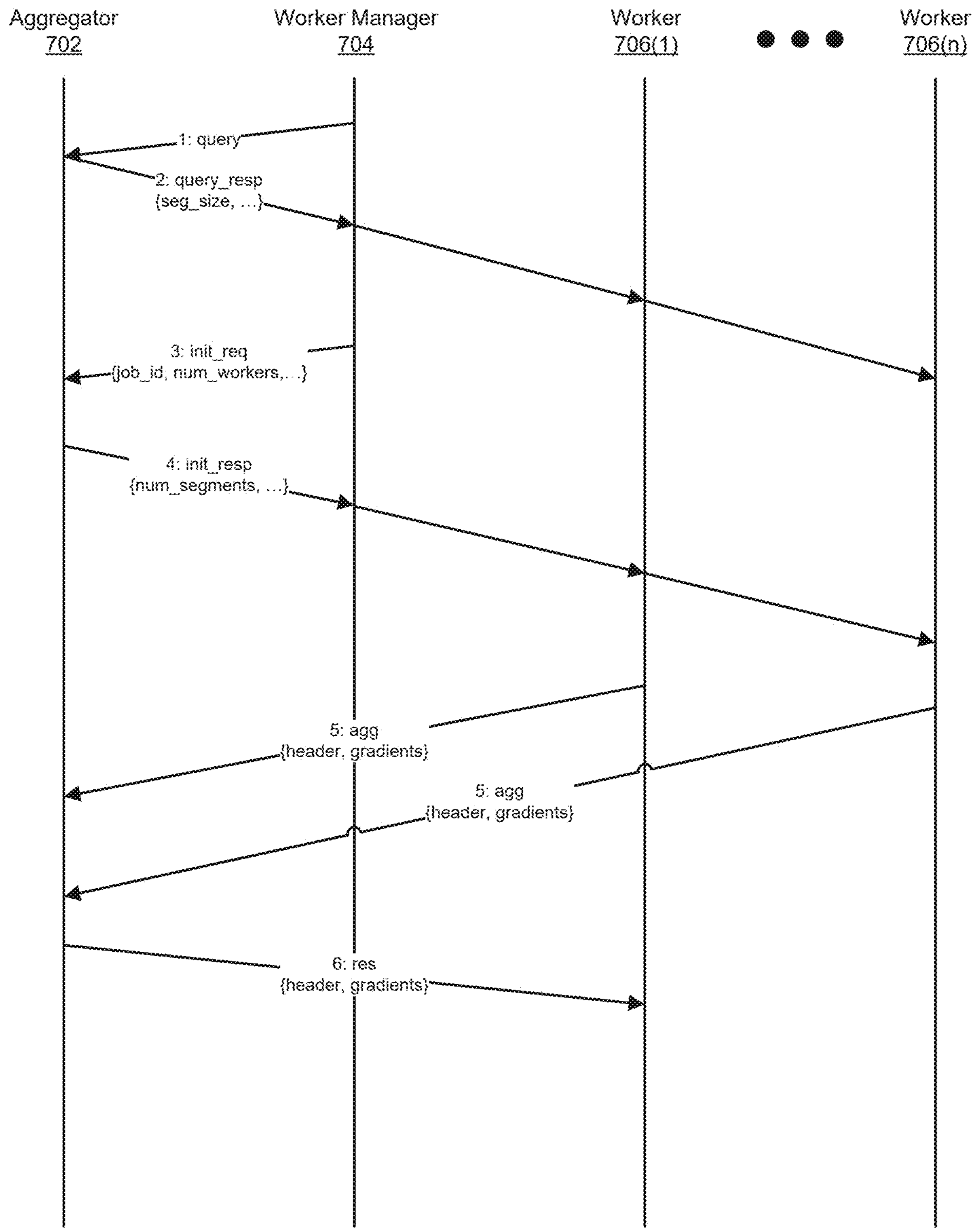
FIG. 7 is a flow diagram of an example method for transmission of data.

As may be appreciated from the above descriptions, transmitting and receiving devices in a network that uses the data transmission methods described herein must communicate certain parameters to each other before data transfer messages can be properly configured. FIG. 7 is a flow diagram illustrating an example initialization of a distributed system that uses the data transmission methods described herein. In this example, an aggregator 702 and worker manager 704 are in communication with an array of workers (illustrated as worker 706(1)-(*n*)) and are performing the initial communications to configure the overall system for data transmission. At step 1, worker manager 704 sends an initial query to aggregator 702 about its implementation-specific parameters, such as the desired segment size. Aggregator 702 responds at step 2 by communicating a query_response including information such as segment size (seg_size), compute chunk size (not illustrated), etc. to worker manager 704 and workers 706(1)-(*n*). At step 3, worker manager 704 can then initialize a job request at aggregator 702 by communicating a job ID (job_id) and number of workers involved in the job (num_workers). The job request can also include other parameters such as the specific operation to be performed, protocol chunk size, worker IDs, output destination info, and the like. At step 4, aggregator 702 can propagate out an initialization response back to worker manager 704 and workers 706(1)-(*n*). This response can contain information such as the number of segments expected to be produced as a result of the workers performing the job indicated at step 3 by worker manager 704. At step 5, workers 706(1)-(*n*) can communicate data to aggregator 702 for aggregation using the communication methods described above. Each message can include a header and gradients, arranged into compute chunks and protocol chunks. At step 6, aggregator 702 can transmit updates, results, etc. back to workers 706(1)-(*n*) in a similar format. Steps 5 and 6 (aggregation and update) can be repeated as necessary and as indicated by the initial job request.

At step 208 in FIG. 2, the systems and methods described herein can provide a representation of an original data payload to at least one recipient. In some embodiments, a packet parser component of a computing system (e.g., packet parser 1104 as illustrated in FIG. 11) can process the indicator of the transmitted data (e.g., an encoding header field), enabling the computing system to provide an indicator of the second data, such as a header encoding, to at least one recipient. In the example of FIG. 11, this indicator can be an offset value that causes compute units to store their data at specific offsets that indicate blocks of data that were omitted from the message, thereby allowing the compute units to account for the omitted data without actually receiving or processing the omitted data. This process will be described in greater detail below with respect to FIGS. 9-11.

Figure 8:
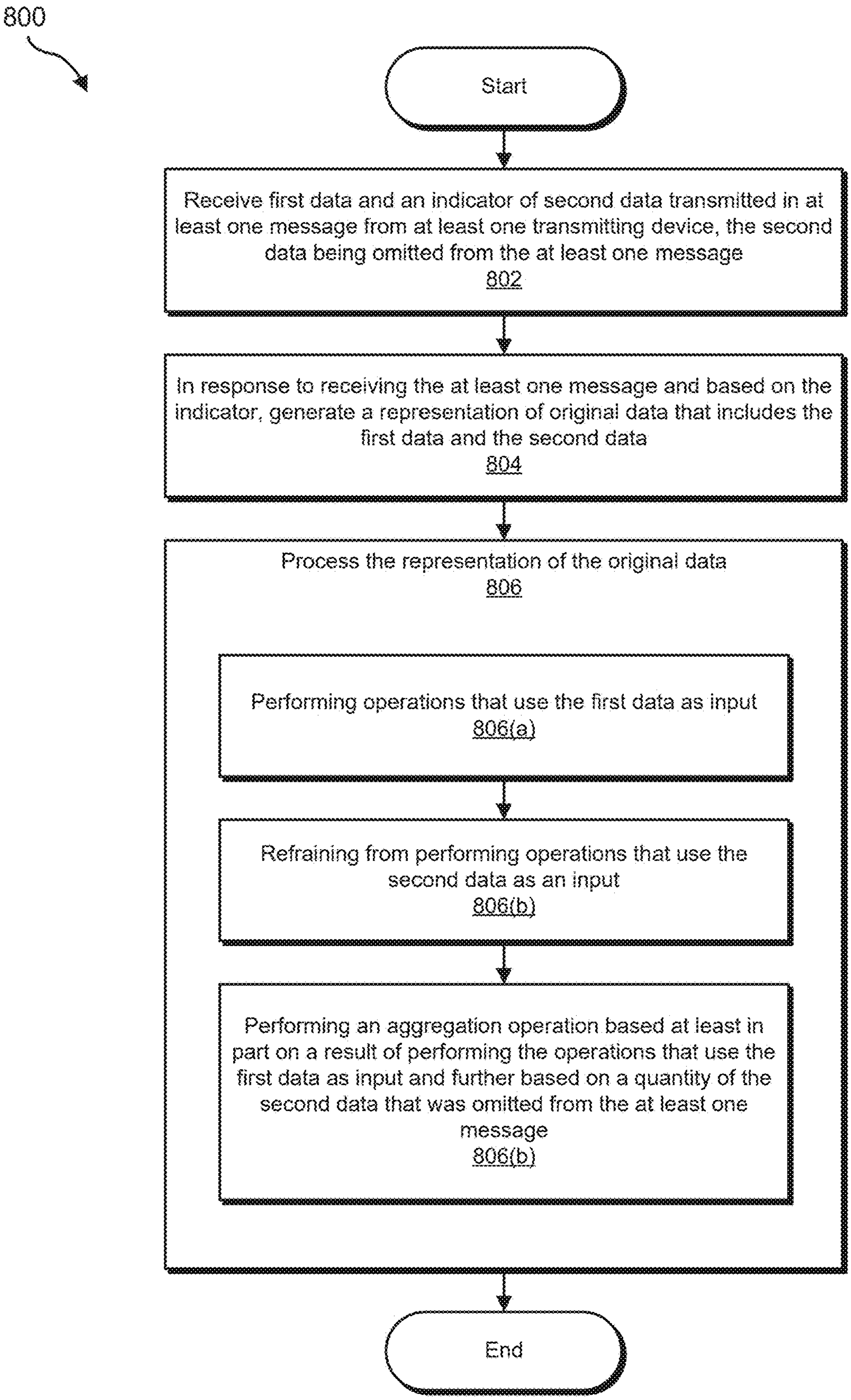
FIG. 8 is a flow diagram of an example method used in aggregation of data transmitted using the principles described herein.

The aforementioned systems and methods for transmitting data may, in some embodiments, transmit data to specialized hardware that is configured to take advantage of sparsity-aware communications. FIG. 8 is a flow diagram of an example method 800 that may be employed by hardware for processing incoming data. The steps shown in FIG. 3 may be performed by any suitable computer-executable code and/or computing system, including receiving device 106 in FIG. 1 and/or variations of one or more of the same. In one example, each of the steps shown in FIG. 8 may represent a process whose structure includes and/or is represented by multiple sub-steps, examples of which will be provided in greater detail below.

As illustrated in FIG. 8, at step 802, one or more of the systems described herein may receive first data and an indicator of second data transmitted in at least one message from at least one transmitting device, with the second data being omitted from the at least one message. For example, receiving device 106 may receive, from transmitting device 102, message 108. Message 108 may include first data 110 and indicator 114 of second data 112 but may not include second data 112. Various examples and embodiments of message 108 and associated indicators are described above with respect to FIGS. 2-7.

Figure 9:
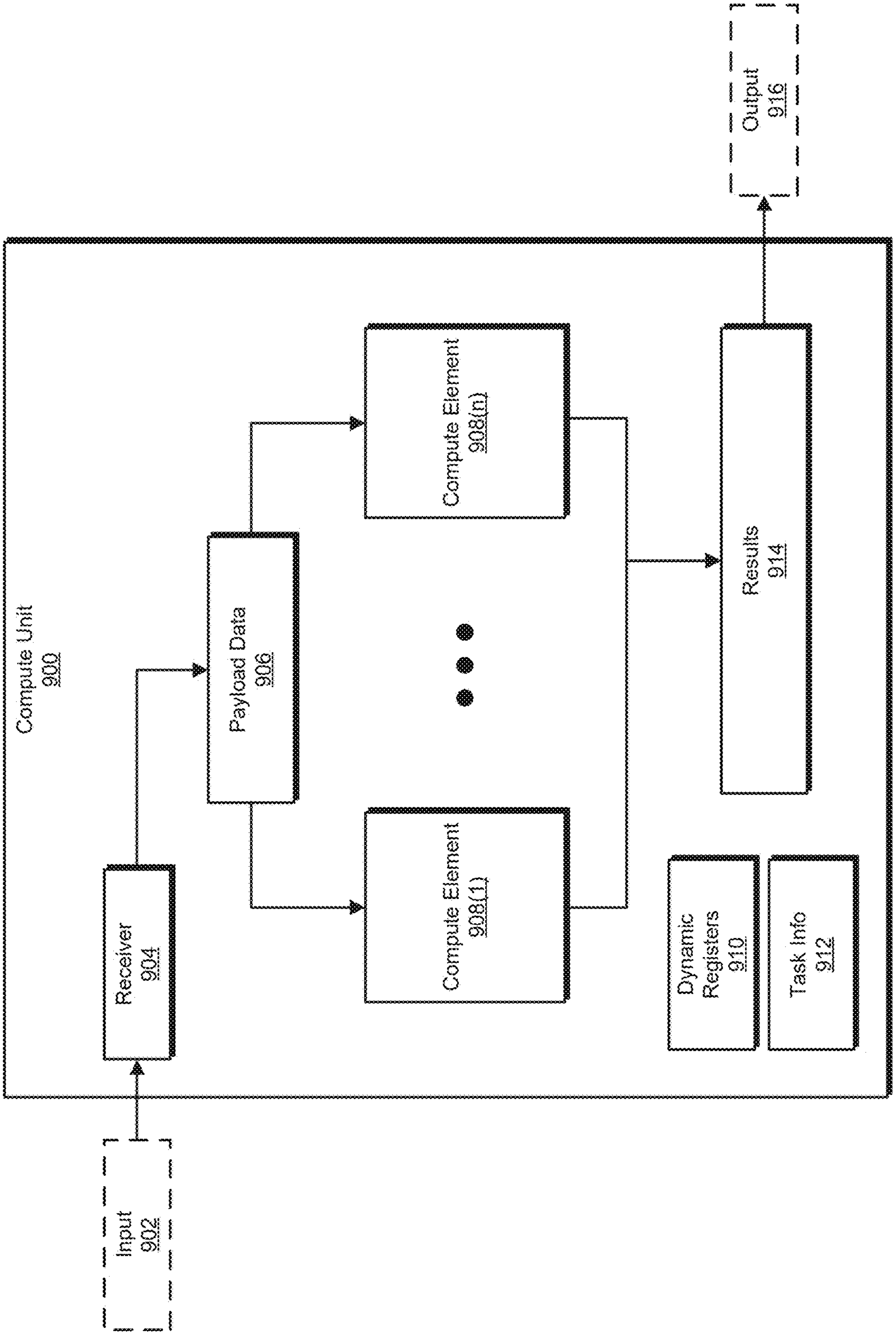
FIG. 9 is a block diagram of an example aggregator compute unit for aggregating data transmitted using some principles described herein.

In some embodiments, the receiving device may be specially configured to process data transmitted using the transmission methods described herein. FIG. 9 is a block diagram of an example receiving device, illustrated as compute unit 900 that is configured to process dense and/or sparse data transmitted using a sparsity-aware communication method such as the one described in greater detail above. Although the example of FIG. 9 shows a receiving device configured to perform aggregation operations, receiving devices can also include workers.

In some embodiments, compute unit 900 can generally represent a computing device, computing system, and/or portions or combinations of the same such as an aggregator or a component of an aggregator in a distributed processing system. In some embodiments, a compute unit can include hardware and/or execute instructions configured to process aggregation requests and/or data for processing that was transmitted using a specific communication protocol. In some embodiments, a compute unit can include hardware and/or execute instructions configured to receive and translate information provided in the headers of messages that provides details about omitted data portions. In the example of FIG. 9, compute unit 900 is configured to fulfill aggregation requests for such a system and is specially configured to processing sparse data payloads that might have certain portions of data omitted for the sake of transmission efficiency.

Compute unit 900, can receive an input 902 and receive input 902 at receiver 904. In some embodiments, input 902 can be a message as described above, such as message 402 in FIG. 4, message 502 in FIG. 5, or message 602 in FIG. 6. Receiver 904 can process the headers of the incoming message and store certain critical information in dynamic registers 910 and/or task info 912. In some embodiments, these message headers can include indications of omitted data, e.g., as an encoding that specifies which blocks of a protocol chunk are included in the payload of the message versus which blocks have been omitted but should still be accounted for.

Task info 912 generally stores information related to the task or tasks being performed by compute unit 900. For example, task_info can store data based on the opcode and/or job_id fields in the headers of an input. Opcode information can specify an operation type (e.g., sum, min, max, etc.) to be performed on the incoming data while job_id can specify a unique job, such as a collective operation during training of a particular ML model. The data stored in task_info can also serve as an error check to ensure that compute unit 900 only processes data intended for the task currently being fulfilled by compute unit 900, e.g., using a stored job_id and/or seg_id. For example, if task_info indicates that compute unit 900 is working on a task with an associated job_id of 0xAB but compute unit 900 receives an input with a job_id of 0xCD, compute unit 900 can ignore the input, return an error, or otherwise handle the input appropriately rather than blindly assuming that the input should be processed. Task info 912 can also include other information such as the number of transmitting devices or workers involved in a task to ensure that data is received from each relevant transmitting device before distributing results or updates back out to the workers. Task info 912 can further include information describing a number of compute chunks per protocol chunk to aid compute unit 900 in assigning data to various individual compute elements for processing, as will be described in greater detail below.

At step 804 of FIG. 8, the systems and methods described herein may, in response to receiving the at least one message and based on the indicator included in the message, generate a representation of original data that includes the first data and the second data. For example, receiving device 106 in FIG. 1, compute unit 900 in FIG. 9, compute element 1002 in FIG. 10, and/or computing system 1100 in FIG. 11 can, based on indicator 114, generate representation 116 that includes first data 110 and indicator 122. Of note, representation 116 may not include second data 112. However, in some embodiments, one or more of the systems described herein may generate representation 116 by reconstructing the omitted data based on, for example, a preset configuration of the system. In these embodiments, representation 116 may contain both first data 110 as well as second data 112.

In the embodiment of FIG. 9, some or all of representation 116 can be represented in dynamic registers for use during computing processes. Dynamic registers 910 can include a variety of registers, such as registers to store specific information included in, for example, header 404 as illustrated in FIG. 4. This information can include indications of data that was omitted from the original input. As a specific example, dynamic registers 910 can include a register to store the data in the encoding field of header 404. This encoding data can aid compute unit 900 in identifying and correctly handling data that was omitted from input 902. Each bit of the encoding can identify the sparsity status of a chunk of the input payload, e.g., whether the specific protocol chunk is included in the input (i.e., if the bit is a 1) or not included (if the bit is a 0) because the chunk contains sparse data. The bit width (i.e., the number of bits) of the encoding can the number of chunks in an input, though any suitable encoding scheme can be used. As one possible example, a 3 bit encoding with a value of "101" means that the input contains 3 protocol chunks, and the second chunk was omitted from the input by virtue of including only sparse data and is only represented in the input as the indication included in the encoding field of the input; the input only contains two protocol chunks rather than the full three indicated by the encoding.

Dynamic registers 910 can also include information such as the number of requests served, representing a number of aggregation requests from transmitting devices processed by the compute unit, the data encoding as described above, sparsity status after aggregation (e.g., the sparsity status or encoding of intermediate steps of the aggregation process and/or of the final output), a number of compute chunks processed (which can be used to properly account for omitted data), and/or any other data necessary to properly process incoming data.

The received data included in input 902 can be temporarily stored by receiver 904 as payload data 906. Of note, payload data 906 only includes the data provided as part of input 902 rather than all data intended to be communicated by the source of input 902. Compute unit 900 can break payload data 906 down into discrete elements, portions, or chunks (e.g., compute chunks as described above) and distribute payload data 906 to a set of compute elements, illustrated as compute elements 908(1)-($n$). The structure and function of compute elements will be described in greater detail below. In some embodiments, payload data 906 can include machine learning gradients to be aggregated by compute unit 900. In these embodiments, the gradients can be assigned to individual compute elements for processing. In some examples, compute elements can process gradients from multiple transmitting devices depending on the needs of compute unit 900.

The number of compute chunks per protocol chunk (which may be stored in or as part of task info 912) can aid compute unit 900 in distributing data to compute elements for processing. In some embodiments, a system may be configured to include a number of data elements per compute chunk equal to the number of compute elements in a compute unit, and each compute element of the compute unit may process a corresponding data element per compute step. However, in some situations, there may be a mismatch between the number of available compute elements and the number of data elements in a compute chunk. In these situations, receiver 904 may buffer incoming data to ensure that an appropriate amount of data can be passed to the compute elements per processing cycle, e.g., to maximize the quantity of data processed per cycle.

Once payload data 906 is distributed to compute elements 901(1)-(*n*), compute elements 901(1)-(*n*) can perform the operations indicated by task info 912 and compute unit 900 can compile the results of the operations performed by the compute elements into results 914, which can then be further processed (e.g., into a model update for workers in an ML training system) and/or provided to other devices as output 916. In some embodiments, output 916 may be formatted according to the transmission methods described above, e.g., omitting data that can be represented in an encoding or other representation that minimizes the total volume of data that must be transferred.

At step 806 in FIG. 8, one or more of the systems described herein can process the representation of the original data by (a) performing operations that use the first data as input; (b) refrain from performing operations that use the second data as input; and (c) perform an aggregation operation based at least in part on a result of performing the operations, and further based on a quantity of the second data that was omitted from the message or messages.

In some embodiments, a compute unit such as compute unit 900 in FIG. 9 can perform operations that use the first data as input and refrain from performing operations that use the second data as input. When receiving a data payload, compute unit 900 can read the data encoding header field of the incoming message or messages, executing processing cycles for each non-zero bit (e.g., when 2 compute chunks are included, compute unit 900 can execute 2 processing cycles; this can be tracked using data stored in dynamic registers 910). The positions of the non-zero bits are tracked and assigned a position, which can be used to calculate data storage, processing, and/or retrieval offsets, thereby allowing compute unit 900 to account for the data that was not included as part of input 902 (i.e., the second data described above) when determining the final result of processing input 902 by, for example, assigning appropriate values (e.g., zero values) at the appropriate positions in the temp storage of compute elements.

In some examples, an offset value can be calculated based on the positions of non-zero protocol chunks, the total number of compute chunks processed so far in a given task, and the total number of compute chunks in the task as a whole. In such an example, the offset is calculated as the position of a given non-zero encoding bit multiplied by the number of compute chunks in a task, added to the number of compute chunks processed at a given step in a task. Intermediate calculation results can thus be stored based on this offset, e.g., by instructing a compute element to store an intermediate result for processing a given gradient or other data portion included in a compute chunk at a position corresponding to the offset value in its temporary storage. In some embodiments, the "skipped" regions of the temporary storage can be populated with data corresponding to the data omitted from input 902, such as zero values in cases where the omitted data comprises zero gradients. Data corresponding to zero encoding bits, especially data blocks containing all zeroes (e.g., zero gradients or gradients with all zero values), can thus be accounted for in the final calculations while being neither transmitted between devices nor fully processed by compute elements of compute unit 900, thereby saving valuable transmission and processing time. In other words, by storing data at specific offsets, compute elements 908(1)-(*n*) can perform aggregation operations that use the first data as input, refrain from performing operations that use the second data as input, and nevertheless complete the aggregation operations based on a quantity of the second data omitted from the original payload provided to compute unit 900. Some examples of aggregation operations include floating point and integer mathematical operations, max, min, OR, and/or XOR operations. Performing a summation aggregation operation without processing the second data may occur by summing the values included in the first data while ignoring the second data (e.g., if the second data includes only zero values). Performing an averaging aggregation operation without processing the second data may be performed by summing appropriate values in the first and/or second data (such as corresponding elements from each worker that are represented in the first and/or second data) and dividing by the number of workers involved in the task. Thus, these operations can properly handle the second data and ensure that it is properly represented in the final aggregation operation without fully processing the second data. Compute elements 908(1)-(*n*) can output final results of calculations (e.g., aggregation operations) to results 914.

Once all the compute chunks included in input 902 are processed by the compute elements of compute unit 900 (determined, e.g., by compute unit 900 traversing all the bits in the data encoding stored in dynamic registers 910), compute unit 900 can determine that the operation request indicated by input 902 is complete and generate output 916 based on results 914. In some embodiments, results 914 and/or output 916 can represent gradient outputs from compute elements 908(1)-(*n*) that represent an update for machine learning training nodes. In some embodiments and as will be described in greater detail below, compute unit 900 can track the sparsity of results 914. In embodiments where output 916 must be transmitted across a network or otherwise passed to other devices, output 916 can be broken down into compute chunks and protocol chunks to take advantage of the sparsity-aware communication methods described above in order to reduce the total amount of data that must be transferred.

In some examples, compute unit 900 can determine that a task is complete by tracking the number of processed protocol chunks and compare it with the number of meaningful bits in the data encoding, which may be the same as the size of the data encoding (e.g., the value of the encoding_size field from a message header). When the number of processed protocol chunks is the same as the number of bits in the data encoding, compute unit 900 can determine that all available protocol chunks have been completed and the task is complete. As may be appreciated from the above description, the transmission method described herein coupled with the hardware of compute units such as compute unit 900 can support processing of both dense and sparse data. Dense data can be accounted for by, for example, encodings with all 1 bits.

In some embodiments, compute unit 900 can track the sparsity of output 916. Each compute element of compute unit 900 can, for each processing step or cycle, output a one-bit signal (e.g., sparsity output 1016) indicating whether the result calculated by that particular compute element at that particular step represents sparse data. In these embodiments, an output of "1" can indicate that the calculated result is not sparse while an output of "0" can indicate that the calculated result is sparse. By performing a bitwise OR operation across all the bits received at a step, compute unit 900 can determine whether a given set of results for a received protocol chunk is populated with sparse data. Specifically, a final result of "0" from the bitwise OR operation can indicate that results 914 of a given processing step or cycle includes only sparse data and thus itself is sparse. This data can be tracked across multiple processing steps (e.g., across multiple incoming protocol chunks) to determine a total aggregate sparsity of the received data. This is one example of how output sparsity could be determined; compute units can use any suitable method for determining the sparsity of an output segment, such as by comparing encoding fields and sparsity information stored in dynamic registers 910 and/or by calculating the sparsity during processing.

Output sparsity information can be used when constructing output 916 by, e.g., using the sparsity information to define an encoding header field for output 916 thereby allowing compute unit 900 to omit data from output 916 and instead include an indication of the data to minimize data that must be transmitted out to other devices. In some embodiments, output 916 can represent a machine learning algorithm update. In these embodiments, the contents of output 916 can include update gradients, indications of zero gradients (e.g., in an encoding header field), or indications of otherwise sparse data.

Figure 10:
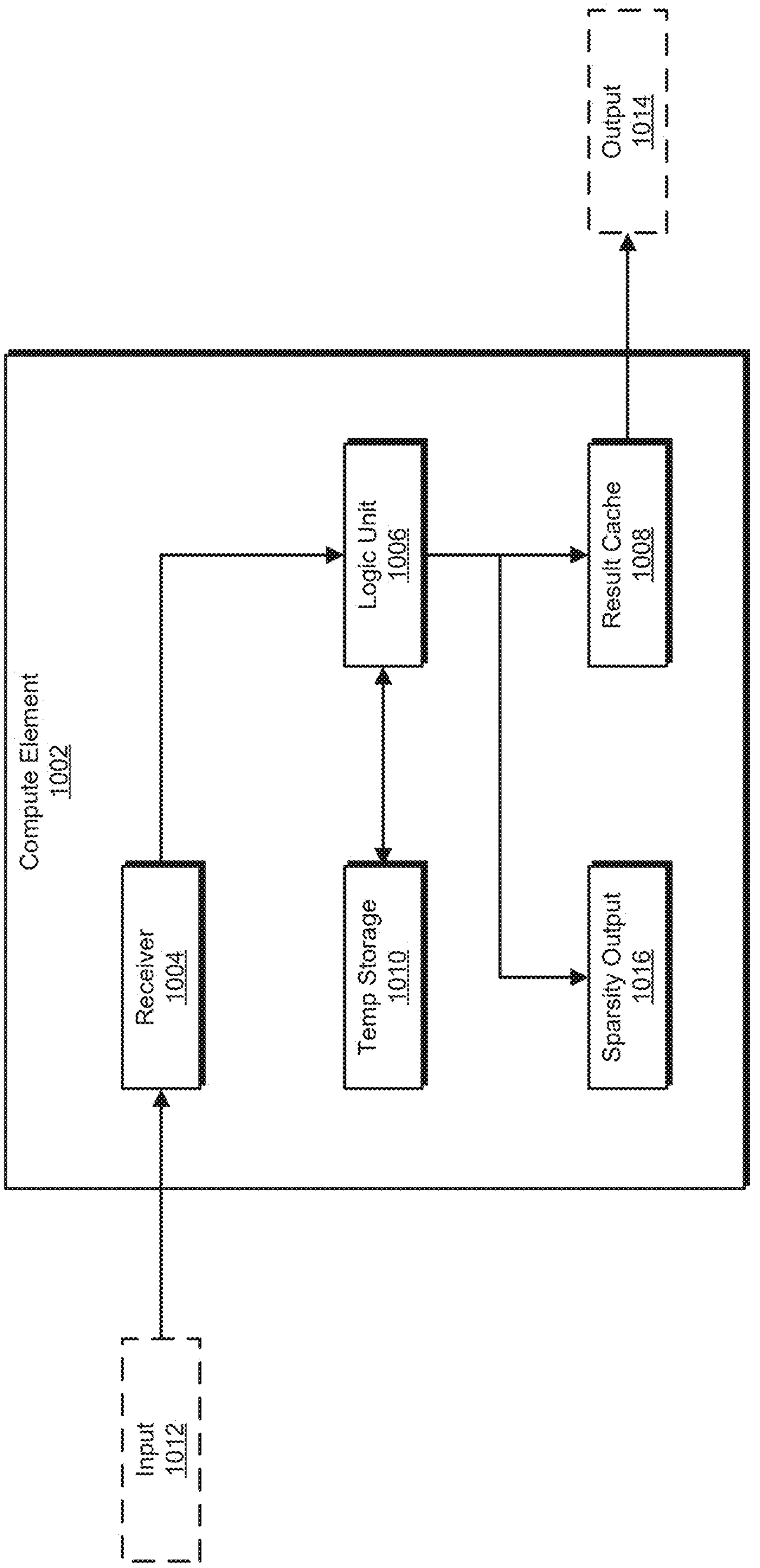
FIG. 10 is a block diagram of an example aggregator compute element that aggregates data transmitted using some principles described herein.

FIG. 10 is a block diagram of an example compute element 1002 that can be incorporated into a larger system such as compute unit 900 in FIG. 10. For example, compute element 1002 can represent a processor, circuit, other hardware elements, and/or combination of such elements configured to perform specific operations on input data. Compute element 1002 can be configured to receive an input 1012 from, for example, a distribution component of the larger compute unit that assigns portions of data (e.g., compute chunks) for processing by the compute element.

Input 1012 can include the actual data to be processed (e.g., a particular unit of data to be processed, such as a gradient to be aggregated) as well as any other information necessary for compute element 1002 to perform the appropriate operations. For example, input 1012 may include information on data that was omitted from the original message, transmission, packet, etc. received by the compute unit from the transmitting device. As a specific example, input 1012 can include a temp storage offset as described above with regards to compute unit 900 in FIG. 9. This information can be derived from the encoding field of the headers of such messages. Input 1012 can be received at receiver 1004, which can include a memory buffer or cache, as well as task logic and/or circuitry that configures logic unit 1006 to perform the appropriate operations on data received as part of input 1012 while accounting for omitted data. In some embodiments, compute element 1002 may refrain from performing calculations on the omitted data, thereby reducing the total computing power and/or time necessary to process the aggregation request assigned to the compute unit.

Logic unit 1006 can receive data to be processed from receiver 1004, as well as instructions regarding the operation to be performed. Logic unit 1006 can also store intermediate results (e.g., intermediate aggregation steps) in temp storage 1010 while logic unit 1006 actively performs operations on incoming data. In some embodiments, logic unit 1006 can perform operations such as floating point and integer mathematical operations, max, min, OR, and/or XOR operations. Logic unit 1006 can be implemented as an algorithmic logic unit or any other suitable type or configuration of processing circuitry.

Temp storage 1010 can be configured to store intermediate results of processes performed by logic unit 1006, such as intermediate aggregation steps. In some embodiments, intermediate results can be stored using offset values, causing compute element 1002 to write data to specific blocks of temp storage 1010 and skip other blocks (which may be filled with predetermined data, such as data representing sparse data or zero gradients). These skipped blocks can represent data that was omitted from input 1012 but still needs to be accounted for in the final calculations performed by compute element 1002 to complete the desired mathematical operations. Temp storage 1010 can be implemented using a variety of technologies, including but not limited to Flip-Flops, distributed RAM, block RAM, UltraRAM, Static RAM, or any other suitable memory for storing data.

Sparsity output 1016 generally represents a register, memory, or other form of tracking the sparsity of the output generated by logic unit 1006. In some examples and as described above with respect to FIG. 9, sparsity output 1016 can be an output bit that can be used by a compute unit to determine the final sparsity of an aggregate result from multiple compute elements as described above.

Result cache 1008 generally represents a local cache or other form of data storage for compute element 1002 that can store a result of a computation for transmission to other portions and/or components of a compute unit or other computing system. In some embodiments, result cache 1008 and temp storage 1010 may represent portions of the same memory. In other embodiments, these two components may be implemented as physically distinct circuits.

Output 1014 generally represents an output of a computation performed by compute element 1002 which can be further processed by a compute unit (such as compute unit 900) that incorporates compute element 1002. In some embodiments, output 1014 can include a gradient update for a machine learning training algorithm, a result of an aggregation operation, or any other result of computations performed by compute element 1002.

Given that floating point operations can in some cases be non-associative due to roundoff errors, e.g., (a+b)+c may produce a different result than a+(b+c), traditional aggregation systems generally process incoming data in a fixed order. For example, a traditional aggregation system may wait until it has received all the data that makes up a particular segment from all involved workers before processing all the data that makes up the segment in segment order. As a specific example, the aforementioned traditional system may always process data from worker 1 first, followed by data from worker 2, etc. However, ordered processing requires large data buffers in order to guarantee that data is able to be processed in order even if it is not received in order. Additionally, traditional aggregation systems must wait until all data included in a segment has been received, which may lead to delays in processing. Moreover, fixed-order processing systems may utilize a predefined 1:1 mapping between specific subunits of data and aggregation subunits responsible for processing that data. For example, a traditional aggregation system may assign worker 1 to aggregation subunit 1 and thus always require worker 1 to send data to aggregation subunit 1 for the entire job and/or task.

The line-rate aggregation system described herein may overcome these deficiencies by processing data out of order. The inventors have appreciated that floating point arithmetic errors may not meaningfully affect a final aggregation result and/or time to convergence, including in machine learning training scenarios. By processing data as it is received, the systems and methods described herein may offer significant reductions in total computation time compared to traditional aggregation systems by eliminating wait times that would otherwise be required for in-order processing. The systems and methods described herein may also enable cheaper and/or smaller physical aggregation units by eliminating the need for physical support of large data buffers. Moreover, the systems and methods described herein may be able to perform dynamic load-balancing and/or task assignment as eliminating the need for fixed-order processing may likewise eliminate the need for pre-reservation of computing resources, allowing for increased utilization of available processing time relative to traditional aggregation systems.

FIG. 11 is a block diagram of an example computing system 1100 configured to receive and process incoming messages as part of a larger network. In some embodiments, computing system 1100 can represent an in-network aggregation device that aggregates data and/or results from transmitting devices. As a specific example, computing system 1100 can be an aggregator for a machine learning training system. In some embodiments and as will be described in greater detail below, computing system 1100 may be configured to process incoming message at line-rate, i.e., as computing system 1100 receives messages, rather than processing incoming messages in some other predetermined order.

Computing system 1100 can include a packet parser 1104, which represents a component (e.g., firmware, software, and/or circuitry) configured to receive incoming data and read fields in headers of the incoming messages. Packet parser 1104 can also extract other metadata from incoming messages. In some embodiments, the headers can include an opcode field that details a type of request and/or an operation to be performed, a job_id field that is a unique identifier representing a specific operation (e.g., on a particular tensor of gradients and/or processing data resulting from a particular step or cycle of a machine learning training process). The headers can also include a segment_id field that identifies a particular portion of data received as part of processing the job or task identified by the job_id field. As a specific example, the headers can be configured according to the sparsity-aware communication methods described above. Some examples of tasks that can be identified by packet parser 1104 (e.g., via an opcode field) include, but are not limited to, handshake requests, handshake acknowledgements, aggregation requests, aggregation acknowledgements, and job completion acknowledgements. Some examples of aggregation operations that could be identified by packet parser 1104 and performed by computing system 1100 include, without limitation, floating point operations, integer operations, max, min, OR, and XOR operations. In some embodiments, job identifiers and segment identifiers can be combined into a task ID that uniquely identifies a specific request to process a specific segment of data. Thus, a single job can have multiple associated task IDs as computing system 1100 processes various portions of the job. Packet parser 1104 can also identify a number of transmitting devices (e.g., workers), a number of data portions (e.g., a number of gradients in a training scheme), and/or other connection information such as source and/or destination IP address, destination queue pair IDs, etc.

Packet parser 1104 can also identify payload data in incoming messages and pass the payload data to computing array 1108 either directly or through resource coordinator 1106. In some embodiments, payload data can be extracted from a message (e.g., separated from header information) and passed to computing array 1108.

In other embodiments, the incoming messages may not be configured in these ways but may use other communication protocols that are capable of generating an associative link between the connection to the parameters listed above, which may have been communicated contextually while setting up the connection. Some examples of connection types in these approaches include TCP connections, UDP packet flows between two transport ports, an RDMA/RoCE queue pair, or any other suitable connection type. Packet parser 1104 can maintain a mapping that links the set of parameters (e.g., opcode, job_id, and segment_id) to the connection identifier, which can be used to process incoming messages. in some examples, packet parser 1104 can use information derived from the connection itself as a representative of some of these parameters while processing incoming messages.

Computing system 1100 can also include a resource coordinator 1106 which represents a component (e.g., firmware, software, and/or circuitry) configured to manage allocation and de-allocation of compute units to various tasks assigned to computing array 1108. Resource coordinator 1106 can track a pool of compute units (e.g., compute units 1114(1)-(*n*)) and include a resource manager, request handler, and extractor. Resource coordinator 1106 can take metadata identified and/or extracted by packet parser 1104 as an input and perform a variety of functions based on the received information. For example, if packet parser 1104 identifies a handshake request, resource coordinator 1106 can provide communicator 1120 with information describing a number of available compute units. As an additional example, if packet parser 1104 identifies an aggregation or other operation request with a new task ID (e.g., a task ID not yet observed by computing system 1100), resource coordinator 1106 can allocate free compute units to fulfill the task. If packet parser 1104 identifies an aggregation or other operation request with an existing task ID, resource coordinator 1106 can look up the compute units assigned to the task and instruct dispatch unit 1110 to provide the incoming data to the appropriate compute units. When computing array 1108 completes a task, resource coordinator 1106 can de-allocate the compute units assigned to the task so that they can be used for other incoming tasks.

In some examples, resource coordinator 1106 maintains a job table that stores job-related information from transmitting devices. An example entry in such a table can include a field for job ID and an associated field for job info. Job info can include information such as the size of each incoming portion of data (e.g., of incoming gradients for processing), opcodes associated with the job, transmitting devices and/or workers assigned to the job, network addresses of the transmitting devices, etc. When computing system 1100 receives a handshake request indicative of a new job, resource coordinator 1106 can extract the job ID and job info from the metadata identified by packet parser 1104 and update the job table as well as ensure that communicator 1120 has access to the new information and/or updates its own information table. When a job is finished, resource coordinator 1106 can remove the table entry for the job as the information no longer needs to be tracked. This process can be triggered either by receiving a job complete message from a transmitting device, a management unit that manages the transmitting devices, or by verifying whether the total size and/or number of data portions (e.g., gradients) processed matches the total size and/or number of data portions indicated as part of the job.

Resource coordinator 1106 can also maintain a table of compute units that tracks the status of the various compute units in computing array 1108. For example, the table of compute units can track which compute units in computing array 1108 are idle as well as which task or job specific compute units are assigned to. When computing system 1100 receives a job request, resource coordinator 1106 can extract a task ID from the metadata identified by packet parser 1104 and use the task ID to determine whether compute units have already been assigned to the task. If there is no entry in the compute unit table, resource coordinator 1106 can allocate compute units to the task. When resource coordinator 1106 receives a completion signal from computing array 1108 (e.g., from arbiter 1118) that a task has been completed, resource coordinator 1106 can mark the compute units assigned to that task as now idle, thus de-allocating those compute units from the task.

Resource coordinator 1106 can allocate compute units in a variety of ways. In some embodiments, resource coordinator 1106 can distribute compute units equally across all active and/or predicted tasks. In other embodiments, resource coordinator 1106 can assign compute units on a first come first served basis (e.g., assign compute units to tasks as they are received). In some examples, resource coordinator 1106 can apply an upper limit on the number of compute units that can be assigned to each task. In some implementations, resource coordinator 1106 can dynamically reassign compute units based on information such as job priority and/or to perform load balancing between active jobs.

In some embodiments, resource coordinator 1106 can include a request handler 1130 that handles handshaking requests from transmitting devices such as workers. For example, resource coordinator 1106 can broadcast the availability and/or current status of compute units to transmitting devices to help those devices decide whether or not to perform a particular task. In this example, a transmitting device may pause a job that does not have any compute units assigned to processing data associated with that job if no compute units are available to handle the data. Likewise, a transmitting device may perform computations related to a job that has compute units assigned to process the data. Request handler 1130 can also inform transmitting devices when tasks associated with those devices have been completed. When computing system 1100 receives a handshake request, request handler 1130 can broadcast information such as the number of available or idle compute units in computing array 1108 to transmitting devices or workers. When computing system 1100 receives a new job request, request handler 1130 can take the job ID and job info described above and configure a destination information table in communicator 1120, which associates the job ID with the destinations for any output data. For example, request handler 1130 can associate a job ID with IP addresses and destination queue pair IDs of all transmitting devices involved in a job.

Computing system 1100 can further include a communicator 1120 which represents a component (e.g., firmware, software, and/or circuitry) configured to facilitate information exchange with other devices. For example, communicator 1120 may be configured to transmit results of computations performed by computing array 1108 to other devices. As a specific example, communicator 1120 can communicate machine learning gradient updates to workers or transmit results to a next level aggregator in a hierarchical aggregation scheme. Communicator 1120 can receive inputs from computing array 1108 (e.g., via arbiter 1118), such as a computational result along with a task ID, and transmit that data to other devices. For example, communicator 1120 can use a destination information table configured by resource coordinator 1106 to forward the computational result along to an appropriate destination based on the associated task ID.

In some examples, communicator 1120 can facilitate a handshake communication between computing system 1100 and another device. When computing system 1100 receives a handshake communication, communicator 1120 can update an entry in the destination information table according to the device attempting to handshake with computing system 1100. Furthermore, communicator 1120 can transmit a handshake acknowledgement message that includes a variety of relevant information about computing system 1100, such as a number of available compute units.

Communicator 1120 can use a variety of methods for communicating with other devices. In some examples, communicator 1120 can communicate using TCP/IP, RDMA, or any other suitable method of communication. In some embodiments, communicator 1120 can format outbound messages to include custom headers such as indicators of data omitted from the message in accordance with the communication methods described above.

Computing system 1100 can also include a computing array 1108 that is configured to perform computational tasks using a set of compute units, such as the compute units described above. Computing array 1108 can incorporate multiple compute units, illustrated as compute units 1114 (1)-(*n*), each of which include a corresponding set of compute elements (illustrated as compute elements 1116(1)-(*n*)). These compute units can function similarly to the example compute unit and compute element discussed in FIGS. 9 and 10. Because compute units perform computations independently of each other, computing array 1108 can be configurable to include any number of compute units and can in some embodiments be reconfigurable even after deployment (e.g., by adding or removing compute units as needed) in order to facilitate scalability. In addition to an array, collection, group, set, etc. of compute units, computing array 1108 can include a variety of other components and/or subsystems to facilitate the transmission and processing of data.

In some examples, computing array 1108 includes a dispatch unit 1110. Dispatch unit 1110 represents a component (e.g., firmware, software, and/or circuitry) configured to forward request information and/or data payloads to compute units assigned to a specific task. Dispatch unit 1110 works in tandem with resource coordinator 1106 to pass payload data to the appropriate compute units. In some embodiments, dispatch unit 1110 can receive payload data along with an identifier of a destination compute unit. Based on this information, dispatch unit 1110 can forward the payload data along to the indicated compute unit.

As may be appreciated from the above description, the combination of resource coordinator 1106 and dispatch unit 1110 can handle allocation of compute units to specific jobs and/or tasks and ensure that data received at system 1100 is assigned to the correct compute unit for the task. This flexibility may allow for modular reconfiguration of computing array 1108, such as by adding or removing physical hardware to support additional or fewer compute units depending on the needs of system 1100. Resource coordinator 1106 and dispatch unit 1110 can then be manually configured and/or automatically detect the hardware configuration of computing array 1108 to ensure that incoming data is delivered to the appropriate compute unit. In embodiments where new compute units are added to computing array 1108, resource coordinator 1106 and dispatch unit 1110 can then handshake with any new compute units and begin dynamically allocating processing requests to the compute unit. In embodiments where compute units are removed from computing array 1108, resource coordinator 1106 and dispatch unit 1110 can reconfigure any dispatch and/or assignment tables and dynamically allocate processing requests to the remaining compute units.

In one example, resource coordinator 1106 can handle dynamic allocation of compute units as system 1100 receives data. In one example, during a handshaking process between resource coordinator 1106 and one or more transmitting devices, resource coordinator 1106 may report a number of compute units that are available to handle incoming data processing requests. When system 1100 receives a message from a transmitting device such as a particular segment of data, resource coordinator 1106 may assign a task to the compute unit to process the segment of data and flag the compute unit as busy. When the compute unit finishes processing the segment of data corresponding to the assigned task, the compute unit may transmit a "task complete" signal to resource coordinator 1106, signaling that the compute unit is now available to handle another incoming segment of data. Thus, the number of compute units assigned to a larger job can be changed on the fly depending on the volume of data being received at system 1100.

In some examples, resource coordinator 1106 may be configured to support limiting the number of compute units that can be assigned to a given job at any given time. In these embodiments, resource coordinator 1106 may stop assigning compute units to process data related to a particular job once the number of compute units processing data related to that job meets the configured maximum. In other words, computing array 1108 may never have more compute units working on data pertaining to the given job than the configured maximum. However, this maximum number of compute units may not be tied to specific compute units but rather represent a maximum number of compute units assigned to process data to the job according to the dynamic allocation process described above. System 1100 may renegotiate this per-job maximum at any time depending on the overall needs of the network and/or any quality of service parameters that need to be maintained. For example, a computing array may include 10 compute units, with two jobs pending (job A and job B). In this example, resource coordinator 1106 may allow up to 5 compute units to process data related to job A and up to 5 compute units to process data related to job B. In the event that system 1100 finishes processing job A before job B, resource coordinator 1106 may raise the maximum allowable number of compute units that can be assigned to processing data related to job B to 10 given that there are no other pending jobs to fulfill. If at a later point in time system 1100 receives a request to being processing data from job C while still processing data from job B, resource coordinator 1106 may allow up to 6 compute units to process data from job B and up to 4 compute units to process data from job C. The maximums described here are for illustrative purposes only; any suitable assignment scheme may be used.

In some embodiments, a single compute unit may be able to process data from multiple jobs in parallel. In these embodiments, the compute unit (e.g., compute unit 900 in FIG. 9 and/or compute unit 1114(1) in FIG. 11) may include multiple temporary storages for storing intermediate computation results as well as multiple dynamic registers or register sets and/or task info registers or register sets. In some examples, a compute unit may include one temporary storage, one dynamic register set, and/or one task information register set for each task the compute unit is capable of handling at a given time. In other words, the compute unit may include n temporary storages, n dynamic register sets, and/or n task information register sets in order to be capable of simultaneously handling n tasks. The compute unit may assign individual compute elements to different task, with the compute elements assigned to a particular task storing intermediate computation results in a temporary storage assigned to that task, with other task-related information likewise being stored in the assigned dynamic register set and/or task information register set.

Context switching between jobs can occur at the compute unit level rather than the dispatcher level. For example, if the compute unit receives data relating to task A, then the compute unit will process that data using the temporary storage, dynamic register information, and other task-related information that is assigned to task A, and use registers assigned to task B in the event that the compute unit receives data relating to task B. Once a task has been completed, the compute unit may release the registers and temporary storage assigned to the task and signal to a resource coordinator that the compute unit is able to accept a new task assignment. In some embodiments, rather than having separate physical storage for each of the above-described registers and/or storages, a compute unit may assign portions of a single register and/or storage to different task. Compute units configured to process multiple task in parallel may thus avoid downtime when waiting for data relating to an active task, instead using that time to process data related to a different task. Likewise, this efficient use of processing time may improve the data processing throughput of a computing array without requiring addition of more arithmetic logic units (ALUs).

Computing array 1108 can also include a controller 1112 which represents a component (e.g., firmware, software, and/or circuitry) configured to program the task information registers in compute units assigned to a task (e.g., task info 912 in compute unit 900 as illustrated in FIG. 9). In some embodiments, controller 1112 can record opcodes and number of transmitting devices being served in the task information register of the assigned compute unit.

Computing array 1108 can further include an arbiter 1118 which represents a component (e.g., firmware, software, and/or circuitry) configured to send results from compute units 1114(1)-(*n*) and provide them to communicator 1120 for transmission to other devices, such as workers or a secondary aggregator. Each of compute units 1114(1)-(*n*) can send a ready signal to arbiter 1118 when they are done processing data, and this ready signal can include a task ID as well as an identifier of the compute unit. Arbiter 1118 can process these ready signals in a variety of ways, from round-robin to priority-based selection schemes depending on the requirements and configuration of computing array 1108. Arbiter 1118 selects a compute unit based on the received ready signals, retrieves the computational result from the associated compute unit, and passes the data along to communicator 1120. In some examples, the data passed to communicator 1120 can include the computational result data as well as a task identifier and/or job identifier. Arbiter 1118 then communicates a completion signal identifying the compute unit to resource coordinator 1106 so that resource coordinator 1106 can mark the compute unit as idle.

In some examples, compute unit 900, computing system 1100, or systems incorporating compute unit 900 can be configured to handle incoming data and data processing requests at "line-rate," i.e., process requests as they are received without accumulating multiple requests in a buffer. Processing data at line-rate offers a number of benefits. In some examples, a data processing system does not need to perform operations in a specific order. For example, aggregation architectures such as the ones described herein may be configured to process incoming data out of order despite minor errors that may result due to quirks of floating point arithmetic in digital processing. These minor errors may not meaningfully contribute to the final calculation and may therefore be ignored by line-rate aggregation systems. As a result, line-rate systems do not need to hold large quantities of data (e.g., in a buffer) until later blocks of data are received, eliminating delays and/or wait times for transmitting devices such as workers to finish their tasks before the receiving device (e.g., an aggregator) begins processing data. Thus, in the example of a worker/aggregator distributed processing system, an aggregator can process results as workers finish their tasks rather than processing results in a specific order, speeding up the overall functioning of the system compared to systems that do not use line-rate processing. Line-rate aggregation can therefore reduce the total computation time for an aggregation request because the aggregation system does not need to buffer large quantities of data to ensure in-order processing. Similarly, line-rate hardware does not require large data buffers for incoming data and may be physically smaller and/or less expensive to produce than hardware configured to process data in order. A computing system configured for line-rate processing may nevertheless include a buffer to help the computing system manage spikes in incoming data, thus allowing transmitting devices to fully utilize available network bandwidth.

In some examples, an aggregation system may nevertheless benefit from partial ordering of incoming messages. For example, a message can be transmitted via multiple network packets. In such an example, only the "first" or initial packet of the message may contain certain header fields, such as an indication of second or omitted data and/or an encoding field that enables a recipient device to determine what, if any, data is omitted from the message. The remaining packets used to transmit the message can include fewer or different fields. In this example, the remaining packets used to transmit the message might only include header fields identifying the message that they represent, such as a job and/or task identifier. In some embodiments, a line-rate aggregation system can process the data included in these remaining packets in any order so long as the initial packet is processed first. As described above in connection with FIGS. 1-7, a sparsity-aware communication method can take advantage of predictable blocks of data (e.g., zero gradients) and omit those blocks of data from transmitted messages, instead including an indicator of the data that can be processed by a receiving device. As described above in connection with FIGS. 8-11, hardware specially configured to take advantage of the benefits conferred by these methods can enable a distributed processing system to fully utilize available network bandwidth while minimizing the total amount of data that must be transferred. Omitting data and instead including an indicator of the data can reduce message size and thus allow messages sent between devices to be transmitted in uncompressed format, thus saving computational time that would otherwise be spent encoding and decoding messages according to a particular compression format. Hardware configured to take advantage of these indicators can account for the omitted data without fully processing the data during computational processes such as aggregation, thereby reducing the total amount of computational power that must be expended to fulfil a particular computational request.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" can generally refer to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:

receiving, via a network by at least one first receiving device from at least one transmitting device, at least one message comprising first data to be provided to at least one second receiving device and an indicator of second data, the second data being omitted from the at least one message;

in response to receiving the at least one message and based on the indicator of the second data, analyzing the at least one message to identify the second data;

generating, based on analyzing the at least one message, a representation of an original data payload, the representation comprising at least the first data and an identification of the second data omitted from the at least one message; and providing the representation of the original data payload to the at least one second receiving device, wherein the original payload data comprised the first data and the second data.

2. The method of claim 1, wherein:

the at least one transmitting device comprises a worker from among a plurality of workers of a machine learning training system;

the at least one first receiving device comprises an aggregator of the machine learning training system;

the at least one second receiving device comprises a circuit of the first receiving device or an alternate device of the machine learning training system;

the first data comprises a first subset of training gradients generated by the worker; and the second data comprises a second subset of training gradients generated by the worker.

3. The method of claim 1, wherein the second data comprises blocks of data that match a specified pattern.

4. The method of claim 3, wherein the specified pattern comprises at least one of:

a machine learning training gradient comprising data of a specified value;

a machine learning training gradient comprising data within a specified range of values;

an identity matrix; or a null matrix.

5. The method of claim 3, wherein the second data comprises blocks of data that match each other.

6. The method of claim 1, wherein:

the indicator of the second data indicates that no data has been omitted from the at least one message; and providing the representation of the original data payload comprises providing the first data and an indication that no data was omitted from the at least one message.

7. The method of claim 1 wherein:

the indicator of the second data indicates that all payload data has been omitted from the at least one message; and providing the representation of the original data payload comprises providing a representation of the second data and an indication that all payload data was omitted from the at least one message.

8. The method of claim 1, wherein each message in the at least one message comprises:

a transmission control header;

a header segment comprising the indicator of the second data, the indicator comprising a payload presence encoding that indicates whether a given portion of payload data is included in a payload of the at least one message; and the payload of the at least one message, the payload comprising portions of payload data indicated as present by the header segment, each portion of payload data comprising a non-overlapping subset of the first data.

9. The method of claim 8, wherein the header segment further comprises a portion size parameter that defines a number of portions in the payload data.

10. A system comprising:

at least one receiving device that is configured to receive messages via a network; and a transmitting device that:

partitions a payload using hierarchical segmentation by:

partitioning the payload into data portions; and partitioning the data portions into data sub-portions;

divides the data payload based at least in part on the data portions and the data sub-portions into a first data and a second data, the second data comprising data that matches one or more criteria;

generates at least one message that includes the first data and omits the second data, the at least one message comprising:

the first data; and an indicator of the second data omitted from the at least one message; and transmits, via the network and to the at least one receiving device, the at least one message.

11. The system of claim 10, wherein:

each one or more data sub-portions includes a plurality of compute parts, each compute part representing a quantity of data that can be processed in a single step of processing by the at least one receiving device; and each message in the at least one message comprises a plurality of data sub-portions.

12. The system of claim 10, wherein:

the transmitting device comprises a worker from among a plurality of workers of a machine learning training system;

the at least one receiving device comprises an aggregator of the machine learning training system;

the first data comprises a first subset of training gradients generated by the worker; and the second data comprises a second subset of training gradients generated by the worker.

13. The system of claim 10, wherein the receiving device performs a summation aggregation operation without processing the second data.

14. The system of claim 13, wherein the second data comprises portions of data that match a specified pattern comprising at least one of:

a machine learning training gradient comprising data of a specified value;

a machine learning training gradient comprising data within a specified range of values;

an identity matrix; or a null matrix.

15. The system of claim 13, wherein the second data comprises blocks of data that match each other.

16. The system of claim 10, wherein:

the indicator of the second data indicates that no data has been omitted from the at least one message; and generating the at least one message comprises generating the at least one message without omitting data and including an indication that no data was omitted from the at least one message.

17. The system of claim 10 wherein:

the indicator of the second data indicates that all payload data has been omitted from the at least one message; and generating the at least one message comprises generating the at least one message without including payload data and including an indication that all payload data was omitted from the at least one message.

18. The system of claim 10, wherein each message in the at least one message comprises:

a transmission control header;

a header segment comprising the indicator of the second data, the indicator comprising a payload presence encoding that indicates whether a given portion of payload data is included in a payload of the at least one message; and the payload of the at least one message, the payload comprising portions of payload data indicated as present by the header segment, each portion of payload data comprising a non-overlapping subset of the first data.

19. The system of claim 18, wherein the header segment further comprises a portion size parameter that defines a data number of portions included in the payload data.

20. A method comprising:

partitioning a payload using hierarchical segmentation by:

partitioning the payload into data portions; and partitioning the data portions into data sub-portions;

dividing the data payload that is to be transmitted to at least one receiving device based at least in part on the data portions and the data sub-portions into a first data and a second data, the second data comprising blocks of data that match each other;

generating, based at least in part on dividing the data payload, at least one message that includes the first data and omits the second data, the at least one message comprising:

the first data; and an indicator of the second data; and transmitting, to the at least one receiving device and via a network, the at least one message.

* * * * *